United States Patent
Brooker et al.

(10) Patent No.: US 11,582,025 B2
(45) Date of Patent: Feb. 14, 2023

(54) EFFICIENT DEDUPLICATION USING BLOCK-BASED CONVERGENT ENCRYPTION

(71) Applicant: Amazon Technologies, Inc., Seattle, WA (US)

(72) Inventors: Marc Brooker, Seattle, WA (US); Derek Manwaring, Mesa, AZ (US); Osman Surkatty, Seattle, WA (US); Mikhail Danilov, Sammamish, WA (US); Peter Martin McDonnell, Glenageary (IE); Stefan Schneider, Monkstown (IE)

(73) Assignee: Amazon Technologies, Inc., Seattle, WA (US)

(*) Notice: Subject to any disclaimer, the term of this patent is extended or adjusted under 35 U.S.C. 154(b) by 145 days.

(21) Appl. No.: 17/037,369

(22) Filed: Sep. 29, 2020

(65) Prior Publication Data

US 2022/0103338 A1 Mar. 31, 2022

(51) Int. Cl.
*G06F 21/00* (2013.01)
*H04L 29/06* (2006.01)
(Continued)

(52) U.S. Cl.
CPC ........... *H04L 9/0637* (2013.01); *H04L 9/065* (2013.01); *H04L 9/0631* (2013.01); *H04L 9/0643* (2013.01); *H04L 9/0861* (2013.01)

(58) Field of Classification Search
CPC ............ H04L 9/0637; H04L 9/0631; H04L 9/0643; H04L 9/065; H04L 9/0861
See application file for complete search history.

(56) References Cited

U.S. PATENT DOCUMENTS

| 4,692,944 A | 9/1987 | Masuzaki et al. |
| 4,780,816 A | 10/1988 | Connell |

(Continued)

FOREIGN PATENT DOCUMENTS

| CN | 1208891 A | 2/1999 |
| CN | 1274224 A | 11/2000 |

(Continued)

OTHER PUBLICATIONS

Accetta, Michael J., The Design of a Network-based Central File System, Carnegie Mellon University, Computer Science Department, Research Showcase at CMU, Aug. 1980, 68 pages.
AWS Key Management Service: Cryptographic Details, AWS KMS Cryptographic Details, Amazon Web Services, Inc., Aug. 2018, 42 pages.
AWS Key Management Service: API Reference, API Version Nov. 1, 2014, Amazon Web Services, Inc., 2020, 230 pages.

(Continued)

*Primary Examiner* — Lisa C Lewis
(74) *Attorney, Agent, or Firm* — Knobbe, Martens, Olson & Bear, LLP

(57) ABSTRACT

Systems and methods are described for providing secure storage of data sets while enabling efficient deduplication of data. Each data set can be divided into fixed-length blocks. The plaintext of each block can be convergently encrypted, such as by using a hash of the plaintext as an encryption key, to result in block-level ciphertext that can be stored. If two data sets share blocks, the resulting block-level ciphertext can be expected to overlap, and thus duplicative block-level ciphertexts need not be stored. A manifest can be created to facilitate re-creation of the data set, which manifest identifies the block-level ciphertexts of the data set and a key by which each block-level ciphertext was encrypted. By use of block-level encryption, nearly identical data sets can be largely deduplicated, even if they are not perfectly identical.

20 Claims, 7 Drawing Sheets

(51) Int. Cl.
*H04L 9/06* (2006.01)
*H04L 9/08* (2006.01)

(56) References Cited

U.S. PATENT DOCUMENTS

| | | | |
|---|---|---|---|
| 4,853,845 | A | 8/1989 | Zimmer et al. |
| 5,218,685 | A | 6/1993 | Jones |
| 5,745,900 | A | 4/1998 | Burrows |
| 5,754,844 | A | 5/1998 | Fuller |
| 5,832,263 | A | 11/1998 | Hansen et al. |
| 5,918,063 | A | 6/1999 | Miyama et al. |
| 5,978,791 | A | 11/1999 | Farber et al. |
| 5,990,810 | A * | 11/1999 | Williams ............ G06F 3/0641 341/51 |
| 6,122,754 | A | 9/2000 | Litwin et al. |
| 6,128,623 | A | 10/2000 | Mattis et al. |
| 6,532,473 | B2 | 3/2003 | Niazi et al. |
| 6,807,632 | B1 * | 10/2004 | Carpentier ............ H04L 63/065 713/180 |
| 6,912,645 | B2 * | 6/2005 | Dorward ............... G06F 16/181 714/E11.12 |
| 6,976,165 | B1 * | 12/2005 | Carpentier ............. G06F 21/00 707/E17.058 |
| 7,051,054 | B1 | 5/2006 | Lee et al. |
| 7,412,462 | B2 * | 8/2008 | Margolus ............ G06F 16/137 713/180 |
| 7,506,034 | B2 | 3/2009 | Coates et al. |
| 8,401,185 | B1 * | 3/2013 | Telang ................ H04L 67/1095 713/193 |
| 9,390,101 | B1 * | 7/2016 | Schneider ........... G06F 16/1748 |
| 10,318,762 | B1 * | 6/2019 | Buckingham ......... H04L 9/3242 |
| 11,329,803 | B2 | 5/2022 | Brooker et al. |
| 2001/0049826 | A1 | 12/2001 | Wilf |
| 2015/0227757 | A1 | 8/2015 | Bestler et al. |
| 2017/0208043 | A1 * | 7/2017 | Bohli .................. H04L 67/1097 |
| 2017/0322733 | A1 * | 11/2017 | Resch ..................... G06F 3/067 |
| 2017/0364450 | A1 * | 12/2017 | Struttmann ........... H04L 63/123 |
| 2019/0362083 | A1 * | 11/2019 | Ortiz .................... G06F 21/6245 |
| 2020/0259636 | A1 * | 8/2020 | Gottipati ............... G06F 3/0641 |
| 2020/0285765 | A1 * | 9/2020 | Li ........................ H04L 63/0428 |

FOREIGN PATENT DOCUMENTS

| | | |
|---|---|---|
| CN | 104917609 A | 9/2015 |
| EP | 0117281 B1 | 7/1989 |
| EP | 0 466 389 B1 | 1/1992 |
| JP | H 06348586 A | 12/1994 |
| WO | WO 1999/015992 A1 | 4/1999 |
| WO | WO 2022/072283 A1 | 4/2022 |

OTHER PUBLICATIONS

Cohen, Jonathan D., Recursive Hashing Functions for n-Grams, National Security Agency, ACM Transactions on Information Systems, vol. 15, No. 3, Jul. 1997, pp. 291-320.
Convergent Encryption, Wikipedia, Aug. 19, 2020, 2 pages. Retrieved from https://en.wikipedia.org/wiki/Convergent_encryption.
Douceur, et al., Reclaiming Space from Duplicate Files in a Serverless Distributed File System, Microsoft Research, Technical Report MSR-TR-2002-30, Microsoft Corporation, Jul. 2002, 14 pages.
Generate Data Key, AWS Key Management Service: API Reference, Amazon Web Services, 2020, 4 pages. Retrieved from https://docs.aws.amazon.com/kms/latest/APIReference/API_GenerateDataKey.html.
Litwin et al., LH*—A Scalable, Distributed Data Structure, Hewlett-Packard Labs, Palo Alto, Dec. 1996, 46 pages.
Petrakis, Euripides G.M., Image Representation, Indexing and Retrieval Based on Spatial Relationships and Properties of Objects, Department of Computer Science of the University of Crete, Mar. 1993, 139 pages.
Perttula, et al., HackTahoe—LAFSI, Mar. 20, 2008, 4 pages. Retrieved from https://tahoe-lafs.org/hacktahoelafs/drew_perttula.html.
Rosenblum, et al., The Design and Implementation of a Log-Structured File System, Electrical Engineering and Computer Sciences, Computer Science Division University of California Berkeley, Jul. 24, 1991, 15 pages.
Storer, et al., Secure Data Deduplication, Storage System Research Center, University of California, Santa Cruz, 10 pages.
Chuan Wen Bing et al.: "Flexible Yet Secure De-Duplication Service for Enterprise Data On Cloud Storage", International Conference On Cloud Computing Research And Innovation, Oct. 26, 2015, pp. 37-44.
International Search Report and Written Opinion received in PCT Application No. PCT/US2021/052227 dated Jan. 14, 2022 in 15 pages.
Puzio et al., "PerfectDedup: Secure Data Deduplication", Springer 2016, DPM and QASA 2015, LNCS 9481, 2016, pp. 150-166.
Wikipedia, "Convergent Encryption", Retrieved using Wayback Machine, Dated Oct. 1, 2013.
Zhou et al., "SecDep: A User-Aware Efficient Fine-Grained Secure Deduplication Scheme with Multi-Level Key Management", Retrieved from IEEE Xplore, 2015 31st Symposium on Mass Storage Systems and Technologies (MSST), 2015, pp. 1-14.
Zooko et al., "Tahoe—The Least-Authority Filesystem", StorageSS'08, 2008.
U.S. Appl. No. 17/037,427, Redundancy Controls in Convergent Encryption Using Dynamic Salt Values, filed Sep. 29, 2020.

* cited by examiner

EFFICIENT DEDUPLICATION USING BLOCK-BASED CONVERGENT ENCRYPTION

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

Virtual machines are typically defined at least partly based on the data used to run the virtual machine, which is often packaged into a disk image. Generally described, a disk image is data set, such as a file, that contains the contents and structure of a disk volume or data storage device. For example, a disk image may contain an operating system, libraries, utilities, applications, configurations, and the like. By generating a virtual machine and provisioning it with a disk that matches the contents of the disk image, a user may configure the virtual machine to implement desired functionality. Disk images are also utilized in other virtualization techniques, such as operating-system-level virtualization, a technique in which the kernel of an operating system enables multiple isolated user space instances (often called "containers") without requiring virtualization of the kernel.

DETAILED DESCRIPTION

Figure 1:
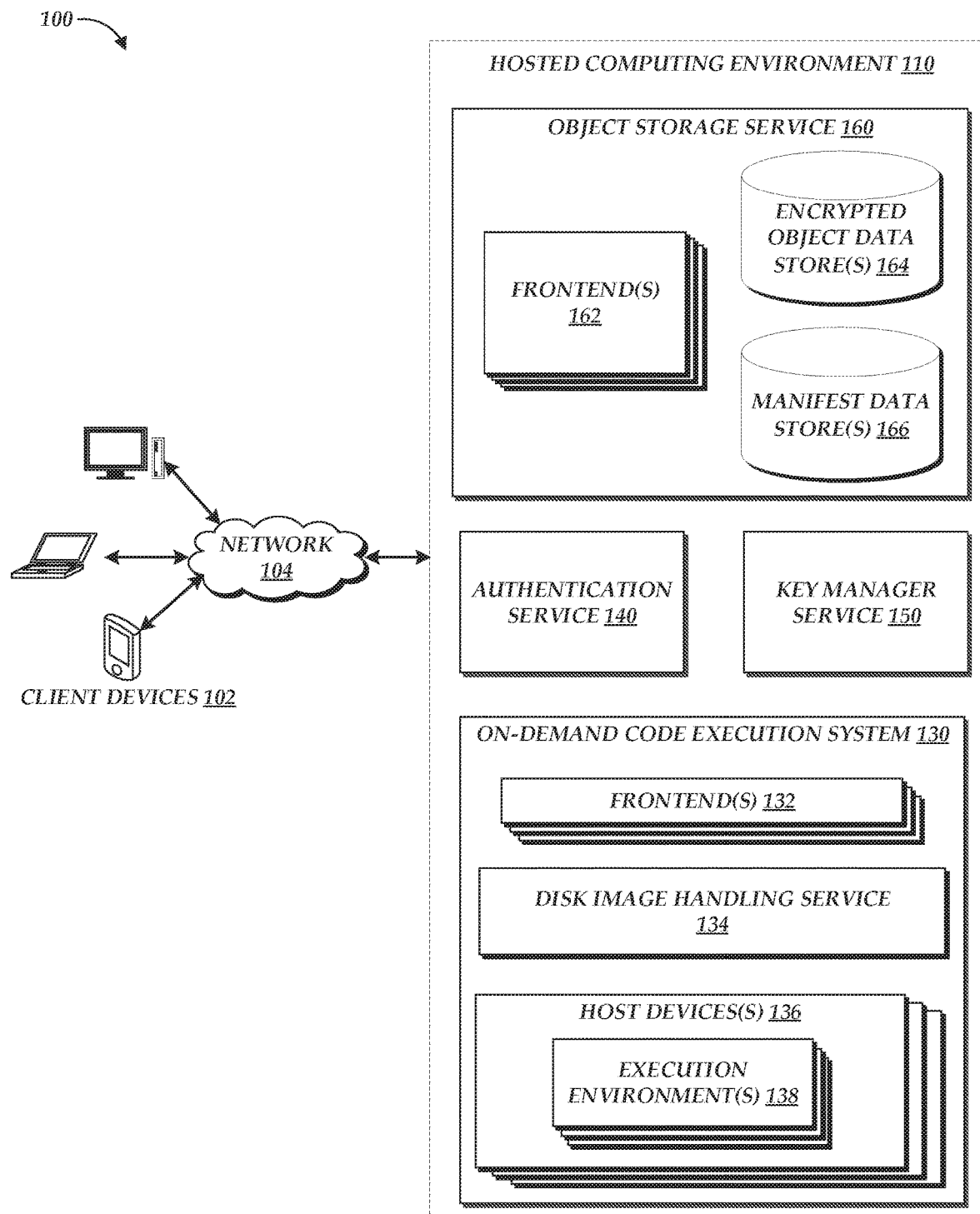
FIG. 1 is a block diagram depicting an illustrative environment in which a hosted computing environment can provide secure storage of data while enabling efficient deduplication and redundancy controls.

Generally described, aspects of the present disclosure relate to facilitating secure storage and deduplication of data on a storage system by using convergent encryption. As known in the art, convergent encryption is a technique in which a data set (such as a file) is encrypted with a key that is deterministically derivable from plaintext (the unencrypted form of the data set) of the data set. Accordingly, under the known techniques of convergent encryption, two identical data sets encrypted using the same convergent encryption technique will result in identical ciphertext (the encrypted form of the data set). Convergent encryption is beneficial in storage technologies—and particularly multi-tenanted storage technologies, where data is stored on behalf of multiple parties—because it enables deduplication of data without requiring knowledge of the plaintext. If two parties attempt to store the same data encrypted using convergent encryption, the storage system can detect the identical ciphertext and store only one copy of that ciphertext, thus reducing storage requirements of the system without requiring that the system have knowledge of the plaintext. While beneficial, this basic convergent encryption technique is not without its drawbacks. For example, because convergent encryption is expected to produce identical ciphertext only given identical plaintext, any alterations to the underlying plaintext (even minor alterations) can result in different ciphertexts and thus prevent deduplication. Illustratively, if two users stored nearly-identical files of a relatively large size (e.g., on the order of tens or hundreds of gigabytes) but one of the two users altered a small portion of the file (e.g., on the order of tens or hundreds of kilobytes (KBs)), deduplication would be expected to fail. Among other drawbacks, the basic convergent encryption technique described above is also subject to at least two cryptographic attacks—a "confirmation of file" attack and a "remaining information" attack. In a "confirmation of file attack," one party with possession of a file can confirm that another party possesses the file, even if the other party stores only ciphertext of the file, simply by encrypting the plaintext of the file and comparing the result to the ciphertext of the other party. In a "remaining information" attack, one party may learn of confidential information of another party placed into an otherwise known data set. For example, where convergent encryption is used to store a form with confidential information added (e.g., including bank numbers), an attacker with knowledge of the generic form can attempt to generate and encrypt the form with all possible mutations of the confidential information, and then learn the confidential information by comparing the generated forms to ciphertext of the other party.

Embodiments of the present disclosure address these shortcomings of basic convergent encryption, providing for increased deduplication of data even in the presence of small changes, and mitigating or eliminating the "confirmation of file" and "remaining information" attacks noted above. More specifically, embodiments of the present disclosure may utilize block-based convergent encryption, in which a data set (e.g., a file) is divided into fixed-length blocks prior to encryption, and each block is then encrypted according to a convergent encryption technique to produce block-level ciphertext. Deduplication can then occur according to the block-level ciphertext. Where two data sets are nearly (but not perfectly) identical, it is expected that a large number of the plaintext blocks of the two data sets would be perfect identical. Accordingly, a large number of the block-level ciphertexts produced for the two data sets would also be identical, enabling deduplication of those identical block-level ciphertexts. In this way, the present techniques can enable the use of convergent encryption to deduplicate nearly identical files as well as perfectly identical files.

To enable decryption of data sets encrypted using the block-level convergent encryption techniques described herein, embodiments of the present disclosure can further provide for manifests of each encrypted data set. Each manifest can generally identify both the block-level ciphertexts created for the data set and, for each block-level ciphertext, an encryption key by which the block-level ciphertext was encrypted. The manifest (or a portion thereof, such as the encryption keys for each ciphertext) may be encrypted according to another encryption key, such as a user-specific key. Thus, only a user who stored a given data set (or their authorized parties) would be expected to be able to access the data of the manifest. Moreover, because keys for each block-level ciphertext are included within the manifest, only a user with a valid manifest would be expected to be able to decrypt the corresponding block-level ciphertexts, thus enabling access to the plaintext data set as a whole. If two users provided overlapping (e.g., identical or sharing some significant portion) data sets, each user can be provided with a distinct manifest. However, at least some of the block-level ciphertexts identified in the manifest would be expected to overlap, and a storage system provider would thus not be required to separately store such the block-level ciphertexts. Accordingly, deduplication within the storage system is improved while maintaining security within such a system.

In one embodiment, security of a storage system as disclosed herein is further improved by identifying block-level ciphertexts according to a message authentication code of the ciphertext. Generally described, a message authentication code (or "MAC") is a short (relative to a data set itself) piece of information used to authenticate the data set, confirming data integrity and authenticity. Thus, two identical data sets, when subjected to the same MAC-generation algorithm, would produce identical MACs. Conversely, two different data sets would be expected to produce different MACs. Each MAC can therefore be said to be "unique" to its corresponding data set (where "unique" indicates substantial surety of uniqueness, rather than absolute uniqueness, as known MAC algorithms inherently possess some very small chance of a "collision," in which different data sets result in the same MAC). In accordance with embodiments of the present disclosure, block-level ciphertexts may identified by a corresponding MAC for the block-level ciphertext. For example, the MAC for each ciphertext may be used as an object or file name for the ciphertext. Deduplication may then occur on the basis of these identifiers, rather than requiring comparison of two ciphertexts themselves. For example, a client (e.g., a user or computing device within the storage system) wishing to store a given block-level ciphertext may first generate a MAC for the ciphertext, and query the storage system as to whether an object or file with that MAC (e.g., with that object or file name) exists within the system. If so, the client can verify that the ciphertext is duplicative, and that therefore there is no need to store the file. While some example embodiments are described herein with respect to MAC identifiers, block-level ciphertexts may further be stored according to other identifiers. For example, block-level ciphertexts may be stored using a hash value of the ciphertext as an identifier, which may also provide many of the advantages described above.

In some embodiments, security of a storage system is further increased by using common storage for MAC- or hash-identified ciphertexts (e.g., store shared among a group of users, rather than having distinct storage for each user), and disallowing directly listing or browse operations with respect to stored MAC- or hash-identified ciphertexts. For example, an interface of the common storage may limit clients to a subset of operations not including a listing of the currently-stored MAC- or hash-identified ciphertexts, such as:

querying whether a given ciphertext exists (e.g., whether an object with a given MAC or hash exists), reading an identified ciphertext if the identifier can be provided, and writing an identified ciphertext if the identifier of the ciphertext is not yet stored in the storage system.

This limited interface may reduce or eliminate security risks associated with storage of the block-level ciphertexts, as it can limit reading of ciphertext to those that can provide a correct identifier, with that identifier being expected to be obtainable only to authorized parties. For example, the particular users storing a given ciphertext may generate or be provided with a manifest including the MAC or hash for the ciphertext, which manifest may be stored separately and potentially encrypted (e.g., using a user-specific key, rather than convergent encryption).

This common storage and limited interface may inhibit both the "confirmation of file" and "remaining information" attacks described above. Specifically, with respect to the "confirmation of file" attack, use of common storage would ensure that even if knowledge is gained that the common storage has stored ciphertext, no user has knowledge of the particular other users who have stored or have access to the ciphertext. Rather, to confirm possession, an attacker would be required to obtain a corresponding manifest; and because such manifests need not be convergently-encrypted, such manifests would not be subject to confirmation of file attacks. With respect to the "remaining information" attack, it is conceivable that a user may attempt to generate all possible permutations of remaining information in a known form, and request to read corresponding ciphertext from the common storage. Were directory listing allowed, an attacker might gain a listing of all stored ciphertext MACs or hashes, and conduct such an attack "offline." However, when directory listing has been disallowed, such an attack would require a one-by-one request for each corresponding ciphertext. As such, the attack would be highly visible to the storage system and easily inhibited by rate-limiting the number of queries and/or reads against the common storage. Accordingly, both attacks can be mitigated or eliminated without inhibiting deduplication.

One potential difficulty of using the above-noted techniques is a reduction in redundancy. While deduplication can reduce excess resource usage in a storage system, such deduplication can concentrate the risk of failure. For example, a failure in storing deduplicated data may destroy the data for all users of that data. Another potential difficulty may occur when conducting the above-techniques within a distributed computing system, and particularly a heavily utilized distributed computing system. Specifically, such a system may have difficulty in accurately determining whether a particular ciphertext is still desired to be stored on a storage system. For example, where ciphertexts are stored in common storage and referenced within manifests, a system might attempt to count the number of manifests referencing a given ciphertext. If no such manifests exist, the ciphertext may be deleted as part of a garbage collection mechanism. However, in a distributed system, it may be difficult or impossible to determine that no current manifest references a given ciphertext, since there may be a possibility that a first device is generating such a manifest while a second device is conducting garbage collection.

To address these difficulties, embodiments of the present disclosure can utilize dynamic salt values when selecting keys for encryption of plaintext. Such salt values may be selected according to attributes of the plaintext, attributes of a request to store the plaintext, attributes of storage of ciphertext corresponding to the plaintext on a storage system, or the like. For example, a salt value can be appended or prepended to plaintext prior to generating a key from that plaintext, such that the encrypted ciphertext (generated by encrypting the plaintext using the key) also varies according to the salt. These salt values can be varied according to different parameters, such as a user or group of users for which data is stored or a time of storage. For example, to reduce concentration of risk due to deduplication, users can be placed into a number of groups equal to a desired data redundancy. Each group may be assigned a distinct salt value, such that deduplication occurs for data stored by members of the group but not between data stored by members of different groups. If a particular user does not wish deduplication to occur with any other users, the user may be assigned a unique salt. Thus, replication can be maintained at a desirable level while still enabling deduplication. As a further example, to reduce the difficulty of "reference counting" (e.g., how many manifests reference a given ciphertext), salts may be varied across time. For example, salts may be altered on a weekly basis, such that data encrypted in a first week results in different ciphertext than data encrypted in a second week. This substantially reduces the difficulties in such reference counting since, for example, no new manifests would be expected to be created with ciphertext corresponding to a now-expired salt. In one embodiment, salts are deterministic, such that all salts for a given attribute (e.g., for a given time period, user or group of users, etc.) are the same. In another embodiment, salts may be probabilistic within a constrained number of possible permutations. For example, with respect to time-based salts, the salt value may be probabilistic such that over a given time period, salts become more and more likely to reflect a future time period rather than a past time period. Illustratively, at the beginning of a week, salts may be probabilistic selected such that they have a high chance of being a first salt (e.g., a "past week" salt) and a low chance of being a second salt (a "current week" salt). As the week progresses, the probabilistic selection may be scaled to favor the second salt rather than the first. In this manner, a "smoothing" of salts—and therefore corresponding ciphertext—may be achieved. While week-duration salts are described herein, any duration may be used for creation of time-varying salts. In addition, user or group varying salts may be used in conjunction with time-varying salts, providing a combination of the benefits noted above. For example, the two varying salts may be concatenated to produce a combined salt used to create a key.

As noted above, the term "convergent encryption" conventionally generally refers to a process in which a data set is encrypted with a key that is deterministically derivable from plaintext of the data set. Thus, identical plaintext files will result in identical ciphertext. Use of salt values, as described above, modifies this outcome such that identical plaintexts are expected to produce identical ciphertext only if identical salts are used. Nevertheless, benefits with respect to deduplication are maintained, because potential salt values (and thus, key and ciphertext values) are constrained to a maximum desired replication level. For example, having 3 potential salt values constrains keys and ciphertext for a given plaintext to 3 potential values, establishing a maximum redundancy of 3 for that plaintext. For ease of reference, this process—in which convergent encryption is modified to allow for n variations of salt and thus a maximum of n permutations of ciphertext—will be referred to herein as "modified convergent encryption." Conventional convergent encryption, in which identical plaintext are guaranteed to produce identical ciphertext, may when necessary be referred to as "purely convergent encryption." Furthermore, use of the general term "convergent encryption" is (unless otherwise explicitly specified) intended to encompass both purely convergent encryption and modified convergent encryption.

Beneficially, the use of dynamic salts, as discussed above, can mitigate or eliminate the "remaining information" attack described above. Such an attack could only occur if an attacker had knowledge of the salt, which in and of itself may limit the attack. Further, if such a salt is limited to a group of users, a given attack could occur only within that group. Moreover, if such a salt is time-limited, a given attack could occur only with respect to data created during that time. Thus, the ability to perform a "remaining information" attack is substantially reduced.

The techniques described herein may be employed in a variety of storage systems storing a variety of data. One particular type of system that may benefit is an on-demand code execution system. Such a system can enable users to provide user-defined executable code, and to invoke such code on-demand. Such systems are sometimes referred to as "serverless" code execution systems, because they generally operate such that a user need not define, configure, or maintain a particular machine on which the code is executed. For example, in contrast to many traditional systems, a user of a serverless system may avoid creating a machine (either virtual or physical), installing an operating system, configuring the machine, etc. It should be emphasized that the term "serverless" does not imply an actual lack of server in such a system, but rather implies that a user need not be concerned with the particular server on which code is executed. Instead, the serverless system may obtain a request to execute code, provision an appropriate environment for that code (which environment is typically isolated from others using virtualization technologies) and execute the code within the environment. The serverless system may further "tear down" or deconstruct the environment when it is no longer needed. Thus, serverless systems provide high ease-of-use compared to traditional server environments, while reducing computing resource usage relative to such environments due to the lack of requirement for dedicated resources and environments.

Some serverless systems may enable users to relatively small amounts of code, such as a particular script to be run. However, this can place restrictions on such code, as it may be limited to functions provided by default within the generic environments of the serverless system (e.g., a default operating system of the serverless system). Often, users wish to execute code with additional functions, which may require for example a different operating system, different libraries, different runtimes, different utilities, etc. To address this, a serverless system can be configured to enable users to provide a more robust set of data supporting code execution, such as an entire disk image (e.g., containing user-defined code as well as an operating system, runtimes, etc., that are used by the code) or an entire machine image (e.g., containing a state of additional elements, such as memory, processor registers, etc.). These images may be used to create a virtual machine or container in which to execute the code. For example, a disk image may be created in accordance with the Open Container Initiative Image Specification, which defines a format for creation of disk images used in OS-level virtualization systems. Thus, a user may define an environment containing any amount of data needed to support execution of code in that environment.

While submission of an image provides the benefits noted above, it also increases the likelihood of data duplication in the serverless system. For example, the disk images of two different users may share a common operating system, and thus have significant overlap. However, the images may vary in other respects, such as in the user-defined code to be executed on the serverless system. Thus, if viewed as a complete data set, traditional deduplication using convergent encryption would view these two disk images as distinct. One potential technique to address this is to view images as "layered," with data being hierarchically divided into layers and each higher layer of data taken precedence over respective lower levels. For example, a first layer may define a generic operating system, while a second layer makes edits to that operating system. Viewing each layer of a disk image as a distinct data set for purposes of convergent encryption may enable some deduplication. For example, two images sharing identical operating system layers may be deduplicated with respect to that layer. However, any modification to a given layer causes deduplication with respect to that layer to fail. Thus, high levels of duplication remain with this technique. In contrast, the block-level convergent encryption techniques discussed herein can enable finer granularity deduplication, even when one user modifies a given layer relative to other users. Moreover, the block-level convergent encryption techniques herein can reduce the amount of data stored at a given device of a serverless system. For example, a host device hosting multiple execution environments may be required to store a full disk image for each such environment, and retrieval of such an image from a storage location can significantly impact the speed of operation of the device (which speed may be critical for operation of the serverless system, as it may directly impact the speed at which requests to execute code can complete). Where the currently described block-level convergent encryption techniques are used, a host device is enabled to more extensively re-use data between different disk images, thus reducing the amount of data stored on the device, reducing the amount of data transferred over a network to the device, and increasing the speed of operation of the serverless system overall. The block-level convergent encryption techniques discussed herein may therefore be particularly well suited to use in serverless code execution systems.

As will be appreciated by one of skill in the art in light of the present disclosure, the embodiments disclosed herein improve the ability of computing systems, such as storage systems, to securely store information while providing deduplication for that information. Moreover, the presently disclosed embodiments address technical problems inherent within computing systems; specifically, the limited nature of computing resources available to store information and the difficulty of deduplicating information while maintaining security of that information. The presently disclosed embodiments address technical problems in basic convergent encryption techniques, enabling deduplication even when data sets are not identical, and mitigating or eliminating attacks against such basic techniques. These technical problems are addressed by the various technical solutions described herein, including the use of block-based convergent encryption and corresponding manifests, storage of MAC- or hash-identified ciphertext blocks in common storage with disallowed directory listings, and use of dynamic salts for determining keys with which to convergently encrypt a data set (along with any combinations of these technical solutions). Thus, the present disclosure represents an improvement on storage systems and computing systems in general.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which client devices 102 may interact with a hosted computing environment 110 via a network 104. By way of illustration, various example client devices 102 are shown in communication with the hosted computing environment 110, including a desktop computer, laptop, and a mobile phone. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The hosted computing environment 110 may provide the client devices 102 with one or more user interfaces, command-line interfaces (CLIs), application programing interfaces (APIs), and/or other programmatic interfaces for utilizing services provided by the hosted computing environment 110, including an on-demand code execution system 130, an authentication service 140, a secrets manager service 150, and an object storage service 160. Although one or more embodiments may be described herein as using a user interface, it should be appreciated that such embodiments may, additionally or alternatively, use any CLIs, APIs, or other programmatic interfaces. Moreover, while end users may operate client devices 102, client devices 102 may also include non-end-user devices, such as servers, or other devices that access respective services provided by the hosted computing environment 110.

The client devices 102 and hosted computing environment 110 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The hosted computing environment 110 is depicted in FIG. 1 as operating in a distributed computing environment including several computer systems that are interconnected using one or more computer networks (not shown in FIG. 1), which systems operate to provide the on-demand code execution system 130, authentication service 140, secrets manager service 150, and object storage service 160. Illustratively, the environment 110 includes a number of rapidly provisioned and released computing resources configured to provide the on-demand code execution system 130, authentication service 140, secrets manager service 150, and object storage service 160. The hosted computing environment 110 may also be referred to as a "cloud computing environment." Each of the on-demand code execution system 130, authentication service 140, secrets manager service 150, and object storage service 160 could also operate within a computing environment having a fewer or greater number of devices than are illustrated in FIG. 1. Thus, the depiction of the on-demand code execution system 130, authentication service 140, secrets manager service 150, and object storage service 160 in FIG. 1 should be taken as illustrative and not limiting to the present disclosure. For example, the elements of the environment 110 or various constituents thereof could implement various Web services components and/or peer to peer network configurations to implement at least a portion of the processes described herein. In some instances, two or more of the on-demand code execution system 130, authentication service 140, secrets manager service 150, and object storage service 160 may be combined into a single service. Each of the on-demand code execution system 130, authentication service 140, secrets manager service 150, and object storage service 160 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

Generally described, the object storage service 160 can operate to enable clients to read, write, modify, and delete data objects, each of which represents a set of data associated with an identifier (an "object identifier" or "resource identifier") that can be interacted with as an individual resource. For example, an object may represent a single file submitted by a client device 102 (though the object storage service 160 may or may not store such an object as a single file). This object-level interaction can be contrasted with other types of storage services, such as virtualized disk storage (e.g., block-based storage services providing data manipulation at the level of individual blocks) or database storage services providing data manipulation at the level of tables (or parts thereof) or the like.

The object storage service 160 illustratively includes one or more frontends 162, which provide an interface (a command-line interface (CLIs), application programing interface (APIs), or other programmatic interface) through which client devices 102 can interface with the service 160 to configure the service 160 on their behalf and to perform I/O operations on the service 160. For example, a client device 102 may interact with a frontend 162 to create a collection of data objects on the service 160 (e.g., a "bucket" of objects) and to configure permissions for that collection. Client devices 102 may thereafter create, read, update, or delete objects within the collection based on the interfaces of the frontends 162. In one embodiment, the frontend 162 provides a REST-compliant HTTP interface supporting a variety of request methods, each of which corresponds to a requested I/O operation on the service 160. By way of non-limiting example, request methods may include:

- a GET operation requesting retrieval of an object stored on the service 160 by reference to an identifier of the object;
- a PUT operation requesting storage of an object to be stored on the service 160, including an identifier of the object and input data to be stored as the object;
- a DELETE operation requesting deletion of an object stored on the service 160 by reference to an identifier of the object; and
- a LIST operation requesting listing of objects within an object collection stored on the service 160 by reference to an identifier of the collection.

A variety of other operations may also be supported. For example, the service 160 may provide a POST operation similar to a PUT operation but associated with a different upload mechanism (e.g., a browser-based HTML upload), or a HEAD operation enabling retrieval of metadata for an object without retrieving the object itself. In some embodiments, the service 160 may enable operations that combine one or more of the above operations, or combining an operation with a native data manipulation. For example, the service 160 may provide a COPY operation enabling copying of an object stored on the service 160 to another object, which operation combines a GET operation with a PUT operation. As another example, the service 160 may provide a SELECT operation enabling specification of an SQL query to be applied to an object prior to returning the contents of that object, which combines an application of an SQL query to a data object (a native data manipulation) with a GET operation. As yet another example, the service 160 may provide a "byte range" GET, which enables a GET operation on only a portion of a data object. In some instances, the operation requested by a client device 102 on the service 160 may be transmitted to the service via an HTTP request, which itself may include an HTTP method. In some cases, such as in the case of a GET operation, the HTTP method specified within the request may match the operation requested at the service 160. However, in other cases, the HTTP method of a request may not match the operation requested at the service 160. For example, a request may utilize an HTTP POST method to transmit a request to implement a SELECT operation at the service 160.

During general operation, frontends 162 may be configured to obtain a call to a request method, and apply that request method to input data for the method. For example, a frontend 162 can respond to a request to PUT input data into the service 160 as an object by storing that input data as the object on the service 160. Objects may be stored, for example, on object data stores, which correspond to any persistent or substantially persistent storage (including hard disk drives (HDDs), solid state drives (SSDs), network accessible storage (NAS), storage area networks (SANs), non-volatile random access memory (NVRAM), or any of a variety of storage devices known in the art). As a further example, the frontend 162 can respond to a request to GET an object from the service 160 by retrieving the object from the stores (the object representing input data to the GET resource request), and returning the object to a requesting client device 102.

In accordance with embodiments of the present disclosure, the service 160 may include one or more encrypted object data store 164 and one or more manifest data stores 166. Each of the data stores 164, 166 may for example represent logical portions of overall object data stores of the service 160. While only data stores 164, 166 are shown in FIG. 1, the service 160 may include other logical data stores.

Generally described, the encrypted object data stores 164 of FIG. 1 are configured to store ciphertext corresponding to convergently-encrypted data sets. These ciphertexts may represent, for example, block-based ciphertexts generated by dividing a data set into fixed-size blocks of plaintext and convergently encrypted each such block. For example, the block-based ciphertexts may be generated by generating a cryptographic hash of each fixed-size block, and then encrypting the block using a block cipher or stream cipher while using the hash as the cryptographic key. The cryptographic hash may be generated according to one of a number of known cryptographic hash functions, such as an algorithm in the Secure Hash Algorithm ("SHA") family, including the SHA-2 set (e.g., SHA-2 256 bit) and the SHA-3 set, and algorithms in the BLAKE family (e.g., BLAKE2 or BLAKE3), etc. As discussed in more detail below, a salt may be added to the plaintext of the block prior to generating the hash. The block or stream cipher may be one of a number of known block or stream cipher algorithms, such as Advanced Encryption Standard (AES) or the ChaCha stream cipher (e.g., ChaCha20). For example, the block cipher may be AES in counter mode ("AES-CTR") or in Galois/Counter Mode (GCM), known as "AES-GCM." The block cipher may in some cases be modified (if needed) to ensure deterministic creation of ciphertext. For example, whereas the GCM algorithm typically includes selection of a random initial counter value, embodiments of the present disclosure may set that value to zero. Such lack of randomness is not expected to reduce security of the algorithm, given that the key used to encrypt each different block is expected to be different, and thus issues of key-reuse for different plaintext do not arise.

The term "block cipher," as used herein, is intended to refer to a cipher that encrypts data according to fixed-size groups of bits, which fixed-size groups of bits are defined internally during a given implementation of the block cipher ("cipher-internal blocks"). Notably, a size of such cipher-internal blocks may differ from the fixed-size blocks of plaintext that are encrypted using the block cipher. For example, while the stores 164 may store ciphertexts of 512 KB, the block cipher (as applied to each 512 KB-sized portion) may encrypt that portion in cipher-internal blocks of 128 bits, 192 bits, 256 bits, 512 bits, etc., during implementation of the block cipher. Thus, while the term "block" is applied herein both to portions of a data set to be encrypted and to cipher-internal blocks (as both are a fixed-length group of bits), this should not be construed to imply that these two differing types of block are of the same size. In practice, it is expected that blocks that are encrypted using a block cipher (that is, the entire data portion encrypted according to a given application of the block cipher) would be larger than the cipher-internal blocks used during implementation of the block cipher (that is, the internal division of a data set being encrypted during the application of the block cipher). Because internal implementations of block ciphers are known in the art, and for avoidance of doubt, reference to the plain term "block" (e.g., without adjectives such as "cipher-internal") as used herein and unless otherwise stated to the contrary, will generally refer to a portion of data being encrypted according to an independent application of an encryption algorithm (e.g., a 512 KB block of a disk image).

In some embodiments, ciphertexts are identified within the store 164 according to a MAC of the ciphertext. The stores 164 may represent common storage, and each identifier of a ciphertext may be unique within the stores 164 among all ciphertexts within the stores 164. The MAC may be generated according to any of a number of known MAC functions, including the Poly1305 MAC function, hash-based message authentication codes (HMACs) generated according to the cryptographic hash functions noted above, and Galois message authentication codes (GMAC) generated during implementation of AES-GCM encryption of the plaintext. The same cryptographic key used to encrypt plaintext may be used to generate the MAC from the ciphertext. In other embodiments, ciphertexts are identified within the store 164 according to another identifier, such as a hash value of the ciphertext (e.g., as a result of applying a cryptographic hash algorithm to the ciphertext).

To facilitate retrieval of encrypted objects from the encrypted object data stores 164, the service 160 further includes a manifest data store 166 configured to store manifests, each corresponding to a data set stored on the service 160. For example, where block-based convergent encryption is used, a manifest may store a list of blocks that make up the data set (e.g., using block identifiers, which may be a ciphertext's hash value, MAC, etc.), and corresponding keys used to encrypt each block. Illustratively, the manifest for a disk image may identify a set of objects within the encrypted object data stores 164 and, for each object, a key used to encrypt that object. Thus, by retrieving and decrypting each object within the manifest, and then combining those objects, the plaintext of the data set can be obtained. Each manifest can illustratively be encrypted (in whole or in part) using a user-specific key, such as a key obtained from the secrets manager server 150 described below.

While multi-object manifests are provided herein as an example, this approach may also be utilized with single-object manifests. For example, rather than using block-based encryption, the service 160 may in some cases convergently encrypt an entire data set, and store a single ciphertext for the data set in the stores 164, which single ciphertext is identified in a corresponding manifest of the stores 166. While single-object manifests may reduce deduplication between objects, other advantages disclosed herein may remain, such as hardening against "confirmation of file" and "remaining information" attacks described above.

In some embodiments, the service 160 may include functionalities to encrypt plaintext and generate manifests in accordance with the above. For example, the frontends 162 may be configured to accept plaintext, store the ciphertext, and generate a corresponding manifest. In other instances, the service 160 may omit such functionality, and require another device to conduct these operations. For example, client devices 102 may themselves conduct such operations, or such operations may be conducted by other elements of the environment 110, such as the disk image handling service 134 of the on-demand code execution system 130, which is described in more detail below.

As noted above, the environment 110 includes an on-demand code execution system 130, which may also be referred to as a serverless computing system. Embodiments for providing an on-demand code execution system 130 are provided, for example, in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 patent"), the entirety of which is hereby incorporated by reference. In brief, the on-demand code execution system 130 can enable client devices 102 to submit executable code (e.g., source code) implementing desired functionality, which functionality is generally referred to herein as a "task." The system 130 can further enable a client device 102 to define one or more triggers that result in execution of the code on the system 130. For example, a client device 102 may request that each time a specific application programming interface (API) call is made, the code should be executed on the system 130. Interactions between the client devices 102 and the system 130 can generally occur via the frontends 132, which may provide interfaces for such interactions. When a trigger occurs, the system 130 can configure an execution environment 138 for the code, which may correspond to a virtual machine instance, a software container, or other logically isolated environment in which code can execute. The system 130 can then execute the code within the environment 138, resulting in a task execution. When the task execution completes, the system 130 can remove the environment 138, thus freeing computing resources for other task executions. The system 130 can thus enable a client device 102 to execute user-defined code on the system 130, without requiring the user to handle aspects of execution such as acquiring a computing device, provisioning the device with the code, etc.

In accordance with embodiments of the present disclosure, the on-demand code execution system 130 can enable users to submit data sets to be provisioned into execution environments 138 to facilitate execution of code. The data sets can include, by way of non-limiting example, one or more of the code, an operating system, runtimes, libraries, utilities, and the like. For example, the data set may be a disk image to be provisioned as a disk drive of a virtual machine or container. As discussed above, data sets of different users may include substantial overlap, such as by including the same operating system, library, runtime, etc. To facilitate secure deduplication of such disk images, the system 130 includes a disk image handling service 134. The service 134 can enable a user (e.g., using a client device 102) to submit a disk image to the system 130 for storage and use in connection with a task. The system 130, in turn, may use the object storage service 160 to securely store and deduplicate disk images. More specifically, in accordance with the present disclosure, the service 134 may divide the disk image into fixed-size blocks, generate a key from the plaintext of each block (e.g., using a SHA or BLAKE algorithm), and then encrypt that plaintext using the corresponding key (e.g., using AES-CTR, AES-GCM, ChaCha20, etc.) to result in a set of encrypted blocks. When an encrypted block is not yet stored within the encrypted object data stores 164, the block may be added to the data stores. For example, the service 134 may use a MAC or hash for each block as an object identifier, and determine whether the stores 164 include an object with that identifier prior to uploading the block. The service 134 may further generate a manifest listing each encrypted block (e.g., by MAC or hash) and a corresponding key used to encrypt the block. The service 134 may then encrypt the manifest using a user-specific key, and store the encrypted manifest within the data stores 166. Because only unique blocks need be stored, multiple disk images with overlapping blocks can be efficiently stored by the system 130. While embodiments are described herein with reference to disk images, other types of data sets, including machine images, may also be used.

As noted above, efficient storage of disk images may further improve efficiency of the system 130 in servicing calls to execute tasks. For example, users of the system 130 may be particularly latency sensitive, such that they desire tasks to execute with little or no overhead latency, which overhead is introduced by operation of the system 130 as opposed to execution of the user-defined code. Such overhead latency may be incurred, for example, due to time required to obtain a disk image from the object storage service 160 and provision an execution environment 138 with the image. Using the deduplication techniques described herein, obtaining and provisioning an environment 138 with an image may include retrieving a manifest, identifying blocks in the manifest, retrieving the blocks, and decrypting the blocks to generate the plaintext disk image. Of these, the operation of retrieving the blocks may introduce the greatest latency, since manifest are expected to be relatively small and because readily-available hardware can conduct efficient decryption of data. However, due to the deduplication discussed herein, host devices 136 may be enabled to re-use blocks between different disk images. For example, if a host device 136 identifies a particular block within a manifest and determines that it has previously retrieved that block (e.g., in connection with another disk image), the host device 136 would have no need to retrieve the block again. Thus, deduplication as discussed herein can reduce the latency that would otherwise be needed to retrieve a disk image, speeding operation of the system 130 overall.

As shown in FIG. 1, the hosted computing environment 110 further includes a key manager service 150, configured to securely store confidential cryptographic keys, such as the keys used to encrypt manifests within the manifest data stores 166. Illustratively, the keys manager service 150 may include specially-designed hardware for storage of cryptographic keys, such as secure enclaves, trusted platform modules (TPMs) and the like. The service 150 can therefore provide a centralized location for a user to store keys, audit usage of keys, and the like.

To facilitate interaction with the hosted computing environment 110, the environment 110 further includes an authentication service 140 enabling client devices 102 to authenticate to services within the environment 110, such as to create or trigger tasks on the on-demand code execution system 130, store or retrieve objects from the object storage service 160, store or retrieve keys from the key manager service 150, and the like. Authentication services 140 are known in the art, and thus operation of the service 140 will not be described in detail herein. However, in brief, a client device 102 may authenticate to the service 140 using a set of authentication information (e.g., a username and password), and the authentication service 140 may return other authentication information, such as an authentication token, to the client 102. The authentication token may then be provided from the client device 102 to other devices to authenticate the client device 102 to the other devices (which devices may verify the token by, for example, passing the token to the service 140 for verification). Services implemented on behalf of a client device 102, such as a task execution on the on-demand code execution system 130, may be authenticated with the authentication service 140 on initiation within the environment 110. For example, a task execution occurring at the request of the client device 102 may be provided, on initialization, with an authentication token identifying the task execution as executing on behalf of the client device 102. Similarly, a host device 136 instructed to provision an execution environment 138 for such a task execution may be provided with the token, thus enabling the device to retrieve a user-specific key and a disk-image manifest encrypted with that key. The host device 136 may then decrypt the manifest and generate a disk image for the task execution, as described herein.

The embodiments of the present disclosure therefore provide a secure mechanism for storage and use of data on the hosted computing environment 110. These embodiments further enable deduplication of that data, reduce resource usage of the environment 110 in storing and transferring that data. Moreover, the embodiments recognize these advantages without exposing data to attacks that might otherwise be possible with basic convergent encryption techniques.

Figure 2:
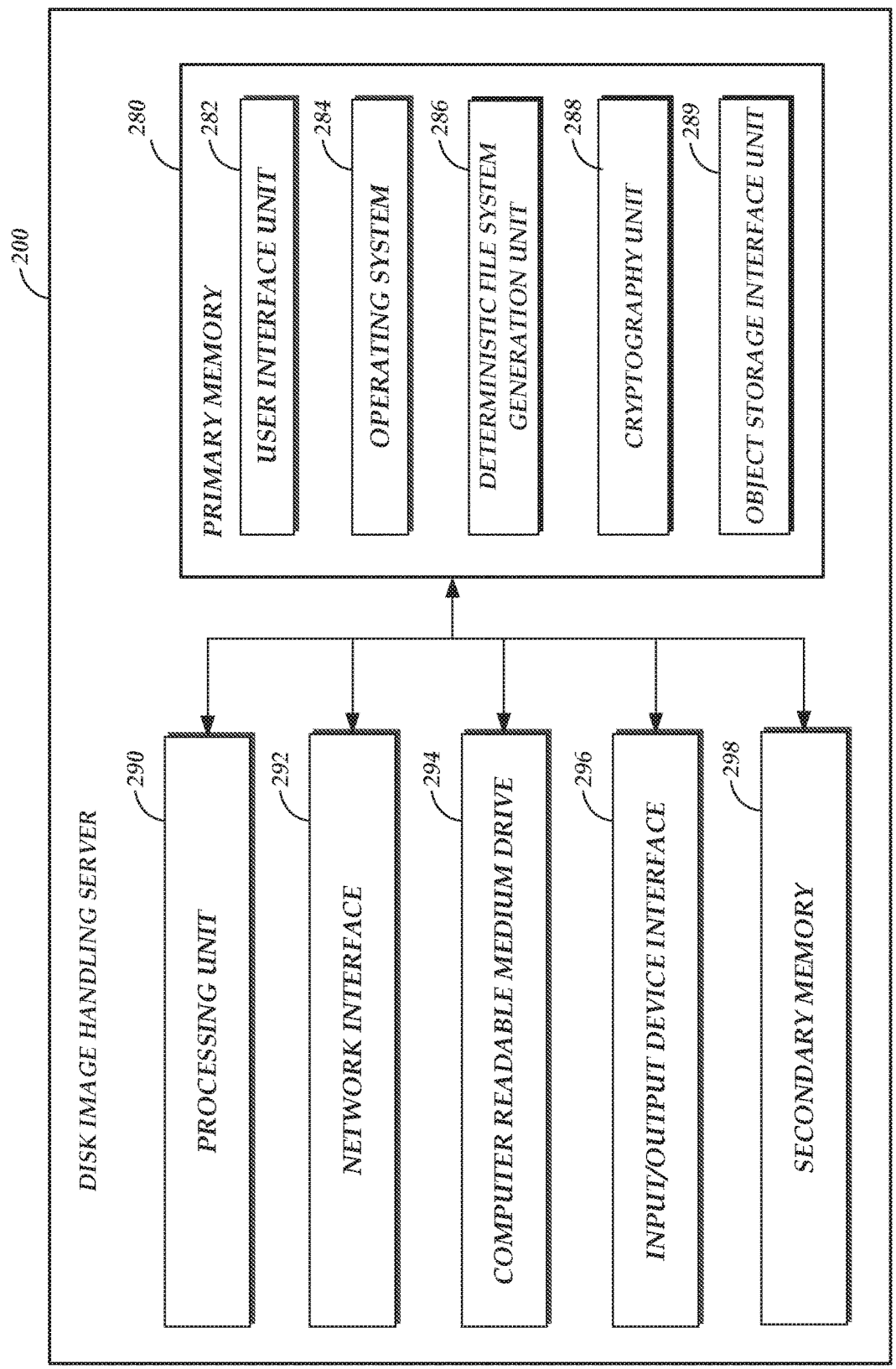
FIG. 2 depicts a general architecture of a computing device providing a disk image handling service configured to obtain a disk image for use by an on-demand code execution system of the hosted computing environment of FIG. 1, and to securely store the disk image while enabling deduplication of blocks of the disk image.

FIG. 2 depicts a general architecture of a computing system (a disk image handling server 200) implementing the disk image handing service 134 of FIG. 1. The general architecture of the server 200 depicted in FIG. 2 includes an arrangement of computer hardware and software that may be used to implement aspects of the present disclosure. The hardware may be implemented on physical electronic devices, as discussed in greater detail below. The server 200 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 2.

As illustrated, the server 200 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from primary memory 280 and/or secondary memory 298 and further provide output information for an optional display (not shown) via the input/output device interface 296. The input/output device interface 296 may also accept input from an optional input device (not shown).

The primary memory 280 and/or secondary memory 298 may contain computer program instructions (grouped as units in some embodiments) that the processing unit 290 executes in order to implement one or more aspects of the present disclosure. These program instructions are shown in FIG. 2 as included within the primary memory 280, but may additionally or alternatively be stored within secondary memory 298. The primary memory 280 and secondary memory 298 correspond to one or more tiers of memory devices, including (but not limited to) RAM, 3D XPOINT memory, flash memory, magnetic storage, and the like. The primary memory 280 is assumed for the purposes of description to represent a main working memory of the server 200, with a higher speed but lower total capacity than secondary memory 298.

The primary memory 280 may store an operating system 284 that provides computer program instructions for use by the processing unit 290 in the general administration and operation of the server 200. The memory 280 may further include computer program instructions and other information for implementing aspects of the present disclosure. For example, in one embodiment, the memory 280 includes a user interface unit 282 that generates user interfaces (and/or instructions therefor) for display upon a computing device, e.g., via a navigation and/or browsing interface such as a browser or application installed on the computing device.

In addition to and/or in combination with the user interface unit 282, the memory 280 may include a deterministic file system generating unit 286, a cryptography unit 288, and an object storage interface unit 289, each of which represent code executable to implement functions of the disk image handling service 134. More specifically, the deterministic file system generation unit 286 represents code to generate a deterministic file system from a given disk image. As noted above, some disk images may include multiple hierarchical layers, with higher-level layers taking precedence over lower-level layers. Use of such layers can increase the total among of data stored in an image, since layers may contain redundant data in the form of data of a lower-level that is later overwritten by a high-level layer. Moreover, provisioning of an environment 138 with a multi-layer image may be time consuming, since multiple passes of a virtualized disk may be needed to "lay down" each layer. To address these issues, the disk image handling server 200 may utilize the unit 286 to convert a multi-layer image into a "flat" (e.g., non-layered) disk image, such as an image of an ext4 file system commonly used within Linux systems. To prevent inhibiting deduplication, the unit 286 can be configured to conduct such conversion deterministically, without respect to dynamic data (such as timestamps) that may otherwise alter creation of a file system from a layered image format. By storing these converted disk images, rather than layered disk images, the unit 286 can reduce data redundancy and increase provisioning speed of the system 130.

The memory 280 further includes a cryptography unit 288 configured to conduct cryptographic operations in accordance with the present disclosure, including one or more of division of a data set into fixed-size blocks, creation of a cryptographic key from plaintext of a block (e.g., as a hash of the plaintext, potentially with additional salt values), encryption of the block, and generation of a MAC or hash for the block. In some instances, the server 200 may include specialized hardware to conduct cryptographic operations. For example, the processing unit 290 may include a portion of application-specific hardware that rapidly conducts a given operation, or the server 200 may include a second processing unit (not shown in FIG. 2) to conduct such an operation. Accordingly, the unit 288 may include code to utilize that specialized hardware in conducting cryptographic operations.

The memory 280 further includes an object storage interface unit 289 configured to interface with the object storage service 160 in accordance with embodiments of the present disclosure. Specifically, the unit 289 may be executable to determine whether ciphertext is already stored within the service 160, to submit not-yet-stored ciphertext for storage, to generate manifests for data sets stored as such ciphertext, and to store such manifests on the service 160. Thus, by execution of the object storage interface unit 289, in conjunction with the other units of FIG. 2, the server 200 can implement aspects of the present disclosure.

The server 200 of FIG. 2 is one illustrative configuration of such a device, of which others are possible. For example, while shown as a single device, a server 200 may in some embodiments be implemented as multiple physical host devices. In other embodiments, the server 200 may be implemented as one or more virtual devices executing on a physical computing device. While described in FIG. 2 as a server 200, similar components may be utilized in some embodiments to implement other devices shown in the environment 100 of FIG. 2.

Figure 3:
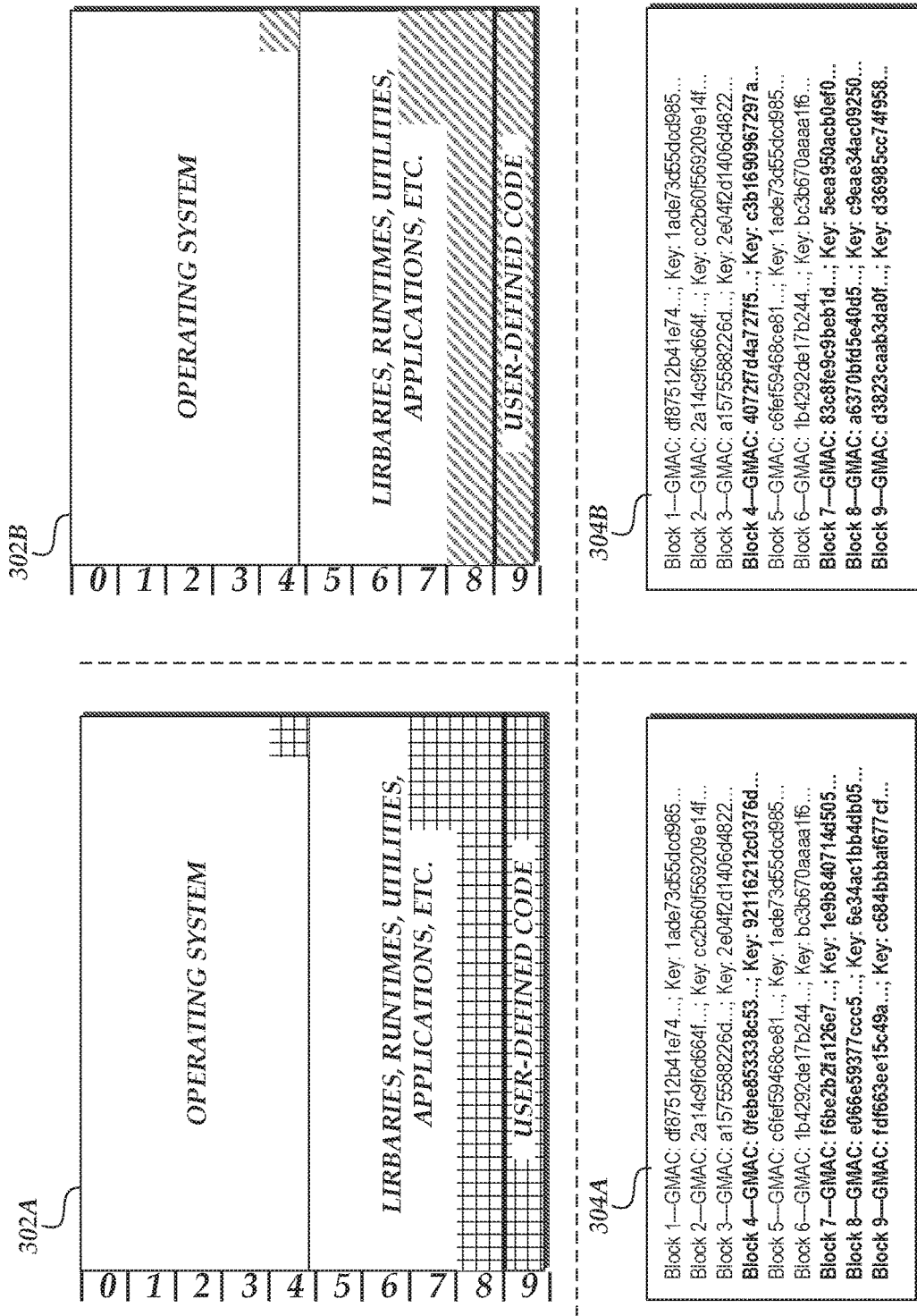
FIG. 3 is a graphical visualization of two data sets with overlapping but not identical data, division of those data sets into blocks that may be securely deduplicated, and manifests for each data set that enable recreation of the data sets from encrypted forms of the blocks.

With reference to FIG. 3, illustrative visualizations of data sets encrypted according to the presently-disclosed embodiments, and manifests for such data sets, will be described. Specifically, FIG. 3 includes illustrative visualizations of two data sets (Data Sets A and B) encrypted and stored according to embodiments of the present disclosure. Each data set illustratively represents a disk image containing an operating system, a variety of libraries, runtimes, utilities, applications, etc. (generally referred to herein as "supporting data"), and user-defined code. Illustratively, the supporting data may represent publicly-available code supporting execution of the user-defined code, while the user-defined code represents code authored by a user, which code is to be executed to implement a task on the on-demand code execution system 130.

In FIG. 3, the bits of each data set are illustrated as elements 302A and 302B. These elements may be representative, for example, of a bit map of a file system included within a disk image. The elements of FIG. 3 are for purposes of clarity greatly simplified, and such a bit map would in practice likely be significantly more complex than the depictions of FIG. 3. In FIG. 3, shared bits between the two data sets are shown without shading, while differing bits are shown with shading. Accordingly, in FIG. 3, both data sets share a majority of bits of their operating systems and supporting data, but include some variations among those portions of the data set. The user-defined code in FIG. 3 is unique to each data set and therefore includes no shared bits. The bits of each data set are further divided in FIG. 3 into blocks, with each horizontal portion of elements 302A and B representing a block. As noted above, the term "block" is generally intended to refer to a fixed-length portion of a data set to be encrypted according to an independent application of an encryption algorithm (e.g., separately from the encryption of other blocks, such that the ciphertext for a given block is independent of the ciphertext of other blocks). These blocks may or may not correspond to operating-system-level blocks (e.g., fixed-length portions of a disk that an operating system reads or writes as a single unit). Blocks may additionally or alternatively be referred to as "chunks," "segments," "portions," etc. Illustratively, each block may correspond to a 512 kilobyte portion of a data set. As shown in FIG. 3, due to shared bits between the data sets, the two data sets are identical with respect to blocks 0-3, 5, and 6, but differ with respect to blocks 4 and 7-9. While both data sets of FIG. 3 include the same number of blocks, in practice data sets may include differing numbers of blocks.

In accordance with embodiments of this disclosure, the hosted environment 110 (e.g., the disk image handling service 134) can be configured to divide the data sets into the blocks, encrypt each block according to a key derived from the plaintext of the block (potentially with additional information, such as a salt) to generate corresponding ciphertext of the block, and generate a MAC or hash for the block. Thereafter, the environment 110 can store the ciphertexts of each block, as identified within the MAC or hash for the block.

To enable retrieval of the data set, the environment 110 can further generate a manifest for each data set, as shown in FIG. 3 by elements 340A and B. Each manifest illustratively includes a listing of blocks that make up the data set, including for each block a block identifier (e.g., a MAC, such as a GMAC, or a hash) and a key by which ciphertext of the block was encrypted. The MACs and keys shown in FIG. 3 represent hexadecimal values that have been truncated for ease of illustration; other formats for storing such MACs (or alternative identifiers) and keys may be used.

By use of the MACs and keys, a device with access to the manifest may retrieve and decrypt the respective data sets. For example, a device may progressively retrieve each block using the MAC identifier of the manifest, and then decrypt the block according to the key to result in plaintext of the block. The plaintexts of each block can then be combined to represent the data set. In some instances, the device may further verify that the ciphertexts have not been modified, by comparing the ciphertext to the MAC for that ciphertext.

As shown in FIG. 3, the specific blocks listed in each of the manifests 302A and B partially overlap. Specifically, the manifests include the same entries for blocks 0-3, 5, and 6, but differ with respect to blocks 4 and 7-9. Accordingly, to represent both data sets (each of which is illustratively shown as 20 blocks in length), only 14 blocks of ciphertext need be stored (6 blocks shared between the manifests, and 4 unique to each). In practice, the number of blocks overlapping between data sets may be much higher, and thus the space savings even greater.

As noted above, the manifest for each data set may be encrypted, such as by using a user-specific key. Accordingly, access to each data set is restricted to those that have access to the corresponding key for the manifest. Notably, this access restriction occurs despite the sharing of blocks between manifests, as a user with a given manifest cannot determine what other manifests may reference a given block. Thus, deduplication between blocks is achieved while ensuring security of each individual data set.

Figure 4:
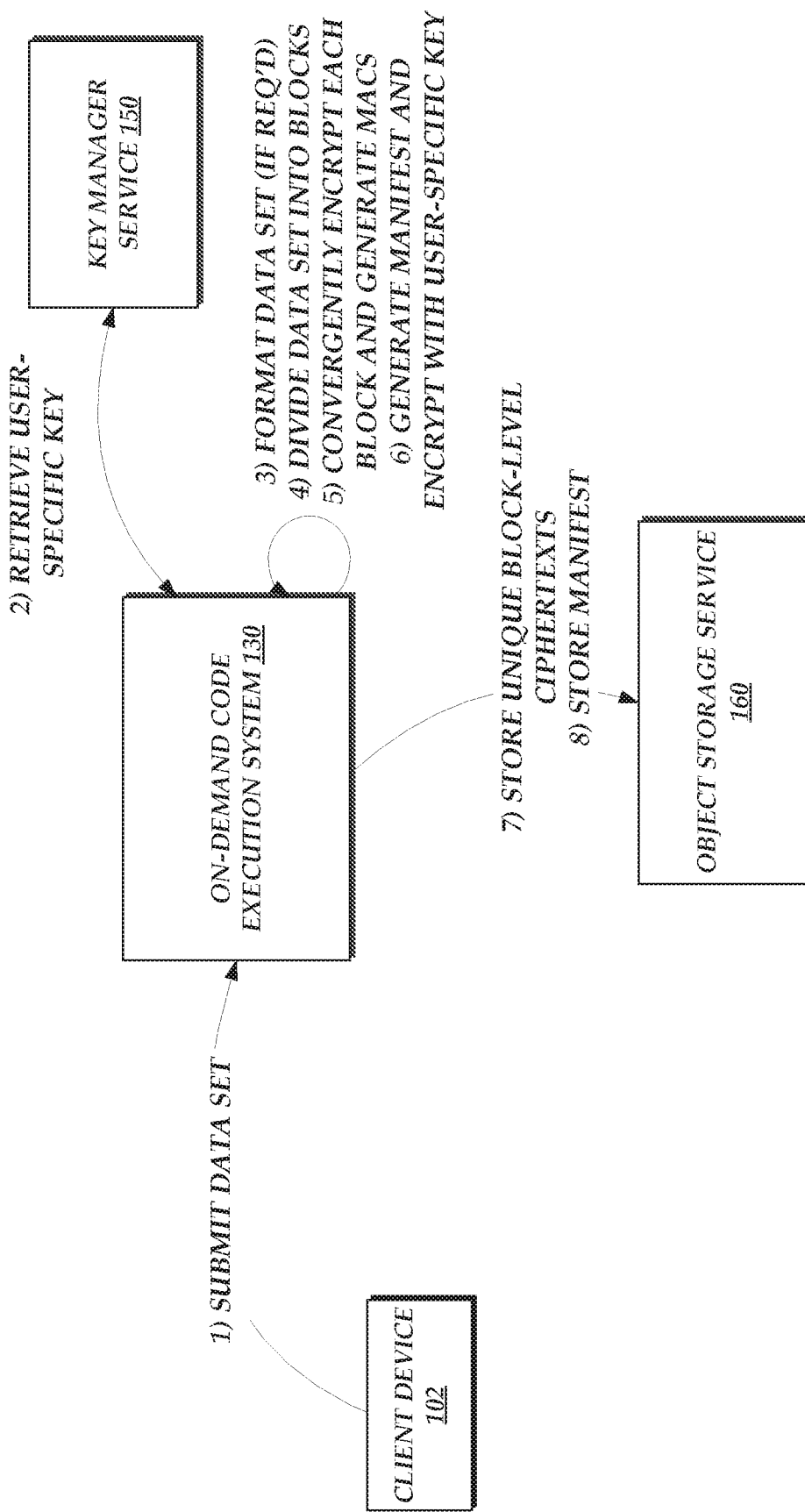
FIG. 4 is a flow diagram depicting illustrative interactions for securely storing a data set on the hosted computing environment of FIG. 1 by dividing the data set into blocks, convergently encrypting each block, storing previously-unstored blocks within a data store, and generating a manifest enabling re-creation of the data set from the blocks of the data store.

With reference to FIG. 4, illustrative interactions will be described for submission, deduplication, and secure storage of a data set to a hosted computing environment 110 in accordance with embodiments of the present disclosure. More specifically, the interactions of FIG. 4 depict submission of a disk image to the on-demand code execution system 130, such as a disk image to be provisioned to an execution environment prior to execution of code within the disk image.

The interactions begin at (1), where a client device 102 submits a data set to the on-demand code execution system 130. Illustratively, the data set may be submitted in connection with creation of a task on the system 130, such that the task can later be triggered to cause the system 130 to provision an environment with the data set and execute code within the environment. As discussed above, the data set may have significant overlap with data sets of other tasks (e.g., of other users or even the same user). It is therefore to the benefit of the system 130 to deduplicate the data set such that overall storage resources used to store the data set are reduced. Moreover, it is to the benefit of the system 130 to ensure security of the data set. Accordingly, at interactions (2)-(8), the system 130 can convergently encrypt the data set according to embodiments of the present disclosure, and generate a manifest for the data set that allows the data set's re-creation at a later time (e.g., to execute the task).

More specifically, at (2), the system 130 obtains from the key manager service 150 a user-specific key to be used to store the data set. The system 130 may illustratively use authentication data (e.g., an authentication token) provided by the client device 102 to enable the system 130 to authenticate with the key manager service 150, such that a user-specific key can be obtained. In one embodiment, the key manager service 150 may be configured to receive a request to create an encryption key associated with the user, and may return the key to the system 130. In some instances, the created key may itself be encrypted using yet another key, which may be referred to as a "master key." The master key may be retained by a user and used to "unlock" other keys, such that the master key need not be used outside of the key manager service 150. Accordingly, in addition to plaintext of the key, the key manager service 150 may return, at (2), ciphertext of the user-specific key. This ciphertext may illustratively be stored along-side data encrypted with the user-specific key (e.g., a manifest), such that a device can later pass the ciphertext of the user-specific key to the key manager service 150, along with the master key, to retrieve the plaintext of the user-specific key. In this manner, the security of the user-specific key and the master key can be ensured.

At (3), the system 130 formats the data set for later storage, if required. Illustratively, if the data set represents a layered file system with redundant data, the system 130 may convert the layered file system into a non-layered filesystem suitable for provisioning on a virtualized execution environment, such as a virtual machine instance or container. As noted above, conversion may occur in a deterministic manner, such any future repetition of interaction (3) with respect to the same data set results in the same converted data set.

At (4), the system 130 divides the data set into fixed-size blocks, such as 512 KB blocks. The system 130 then, at (5), convergently encrypts the plaintext of each block. Specifically, in the interactions of FIG. 4, the system 130 generates an encryption key for each block based on the plaintext of the block. Each key may represent a hash of the plaintext of a corresponding block, such as a SHA or BLAKE hash. In some instances, each key may reflect processing of both the plaintext of a corresponding block and one or more salt values selected for the block according to a desired maximum replication level of the block on the system 130. Selection of such salts is described in more detail below with respect to FIG. 7. The system 130 then encrypts each block with its corresponding key, to result in ciphertext of the block. For example, the system 130 may encrypt each block using AES, potentially AES-CTR, AES-GCM, or ChaCha20. In some embodiments, the algorithm may be modified to ensure that it proceeds deterministically (e.g., without random variance between implementations), such as by initializing seed values (e.g., initialization vectors, or "IVs") to a known fixed value, like zero. Additionally, the system 130 generates an identifier for each block. As noted above, this identifier may be a MAC, such as an HMAC (e.g., using the key for the block and an appropriate hashing algorithm, including those noted above) or a GMAC (e.g., generated during encryption of the plaintext using GCM of an appropriate cipher), a hash value of the ciphertext, or other unique identifier.

At (6), the system 130 generates a manifest for the data set, including a listing of block-level ciphertexts (e.g., using identifiers of those ciphertexts, such as their corresponding generated MACs or hash values) and the respective keys used to encrypt the plaintexts of the blocks into the block-level ciphertexts. Example manifests are shown above with respect to FIG. 3. The system 130 further encrypts the manifest with the user-specific key, ensuring that only authorized parties can access the plaintext of the manifest.

At (7), the system 130 stores unique block-level ciphertexts on the object storage service 160. Illustratively, the service 160 may provide an interface by which the system 130 can query whether a given block-level ciphertext is currently stored on the service 160, such as by using the MAC or hash of the ciphertext. For example, the service 160 may allow a HEAD operation that provides metadata of an object when stored on the system, or "null" when such an object is not stored. When such a ciphertext is not yet stored, the system 130 can store the ciphertext in the service 160. Otherwise, when a ciphertext is already stored, the system 130 can discard such blocks, avoiding use of storage resources on the service 160. The service 160 may disallow other operations, such as a listing of all objects stored, to increase security of the system.

Additionally, at (8), the system 130 stores the manifest on the service 160, thus ensuring that the data set can later be retrieved (in the form of block-level ciphertexts) and decrypted to result in plaintext of the data set. Accordingly, a data set can be efficiently stored on the service 160 in an encrypted manner while providing efficient deduplication.

Figure 5:
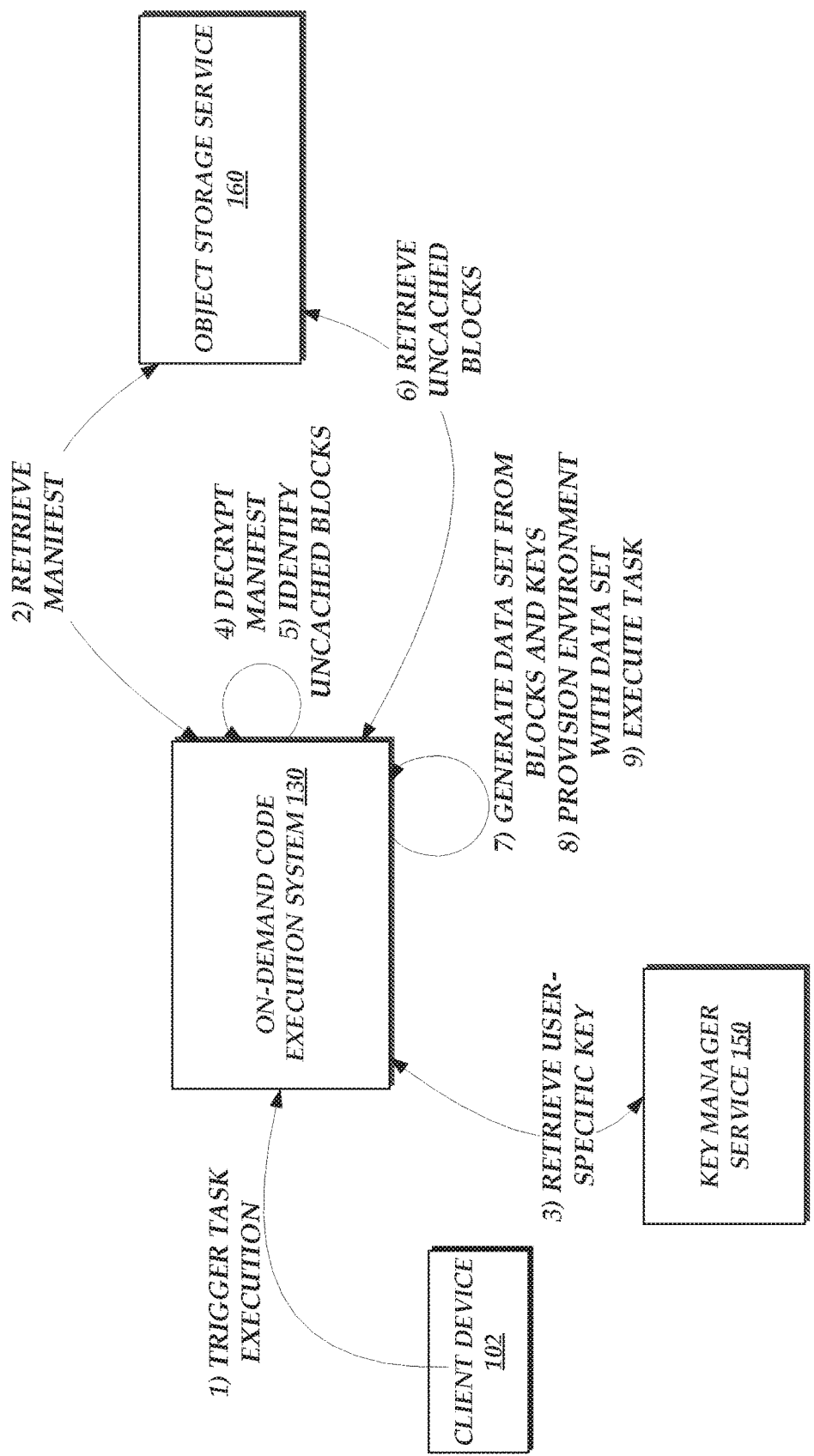
FIG. 5 is a flow diagrams depicting illustrative interactions for utilizing a manifest created in accordance with embodiments of the present disclosure to recreate a data set stored as a set of encrypted blocks on the hosted computing environment of FIG. 1.

With reference to FIG. 5, illustrative interactions will be described for utilizing a manifest created in accordance with embodiments of the present disclosure to recreate a data set stored as a set of encrypted blocks on the hosted computing environment 110 in accordance with embodiments of the present disclosure. More specifically, the interactions of FIG. 5 depict re-creation of a disk image stored on the hosted computing environment 110 and use of the disk image by the on-demand code execution system 130 to facilitate execution of a task.

The interactions begin at (1), where a client device 102 triggers execution of a task on the system 130. While a client-device initiated trigger is shown in FIG. 1, task triggering may occur via a variety of mechanisms, such as being initiated by a different computing device, being initiated by the system 130 in response to satisfaction of a trigger condition, etc.

It is assumed for the purposes of description of FIG. 5 that the triggered task is associated with a disk image containing data used during execution of code of the task. The system 130 may illustratively store metadata regarding the task that identifies that disk image and, for example, a manifest for the disk image and a key with which the manifest is encrypted. Accordingly, a (2) and (3), the system 130 retrieves the manifest and the user-specific key from the object storage service 160 and the key manager service 150, respectively. Thereafter, at (4), the system 130 decrypts the manifest using the user-specific key, to result in plaintext that identifies i) a set of block-level ciphertexts and ii) a key with which each block-level ciphertext was encrypted.

At (5), the system 130 identifies any block-level ciphertexts, as identified in the manifest, that are not yet cached at the system 130, and retrieves those uncached blocks at (6). As noted above, due to overlaps between data submitted for various tasks, individual blocks of different data sets used by the system 130 may overlap. For that reason, and due to use of convergent encryption as described herein, it is also possible that individual block-level ciphertexts are shared among different data sets. Where the system 130 (e.g., an individual host device within the system 130 that is operating to execute the present task) has recently executed another task, it is therefore possible that the system 130 has already obtained one or more of the block-level ciphertexts identified in the manifest for the present task. Thus, the system 130 need only retrieve uncached blocks, reducing the time and computing resources needed to obtain all blocks within the manifest.

Thereafter, at (7), the system 130 generates the data set (e.g., the disk image) for the task using the manifest and the block-level ciphertexts. More specifically, the system 130 utilizes the block-level keys of the manifest to decrypt each block-level ciphertext, to result in plaintext of each block. These plaintexts can then be combined to reconstitute the data set.

At (8), the system 130 provisions a virtualized execution environment, such as a virtual machine instance or container, with access to the data set. For example, the system 130 may "mount" the data set as a filesystem of the execution environment. The system 130 then, at (9), executes the task within the environment. Accordingly, via the interactions of FIG. 5, the system 130 can efficiently execute tasks using data sets that are securely stored on the service 160, in a manner that enables efficient reuse of blocks between those data sets and thus reduces resource usage of the system 130.

Figure 6:
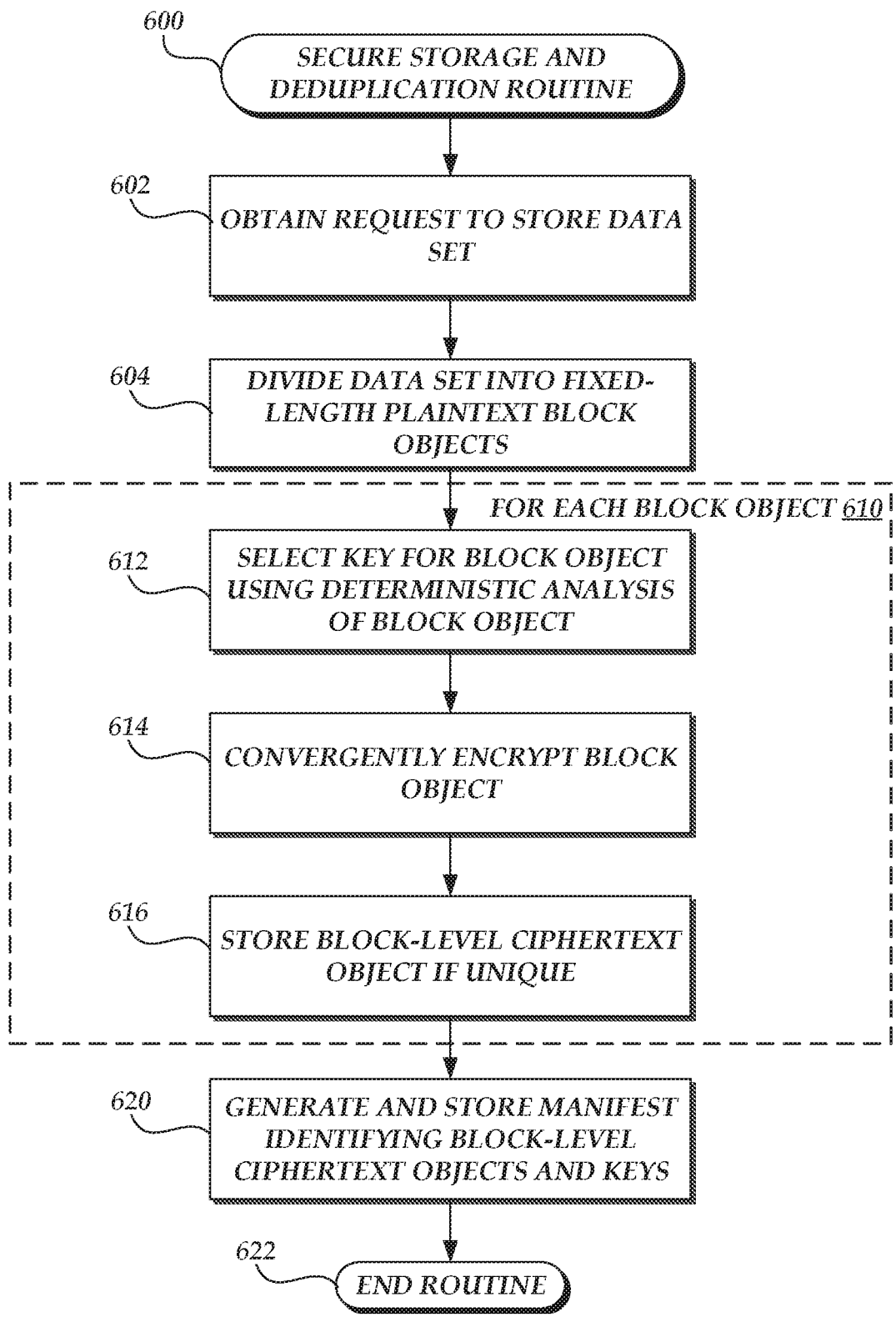
FIG. 6 is a flow chart depicting an illustrative routine for secure storage and efficient deduplication of a data set by dividing the data set into blocks and convergently encrypting each block, while providing a manifest enabling re-creation of the data set from the encrypted blocks.

With reference to FIG. 6, an illustrative routine 600 will be described for secure deduplicated storage of encrypted data. The routine 600 may be implemented, for example, by the on-demand code execution system 130, such as by the disk image handling service 134.

The routine 600 begins at block 602, where the system 130 obtains a request to store a data set. The data set may represent, for example, a disk image to be provisioned to a virtualized environment of the system 130 to facilitate on-demand execution of user-specified code contained within the disk image.

At block 604, the system divides the data set into fixed-length plaintext block objects, such as 512 KB sections. The term "object," as used herein, refers to a group or collection of data, generally without regard to how that group or collection is stored (e.g., in memory as a data structure, on disk as a file, in a database as an entry, etc.).

Thereafter, the routine 600 enters loop 610, where blocks 612-616 occur for each plaintext block object created at block 604. While described as a loop, implementation of blocks 612-616 may be independent, and thus multiple iterations of loop 610 might occur in parallel. More specifically, at block 612, the system 130 selects a key for the plaintext block object, based at least partly on a deterministic analysis of the plaintext block object. For example, the system 130 may pass the plaintext of the block object through a hashing function, such as the cryptographic hashing functions noted above (e.g., a function within the SHA family, the BLAKE family, etc.), to result in a hash value used as the key. As discussed in more detail below with respect to FIG. 6, the system 130 may in some instances add a salt value to the plaintext prior to hashing, which salt may be selected according to desired deduplication properties of the resultant data (e.g., according to a user or group of users on behalf of which the resultant data is stored, according to a time of encryption, etc.).

At block 614, the system 130 convergently encrypts the plaintext block object using the selected key, to result in an encrypted ciphertext object. For example, the system 130 may encrypt the plaintext block object using a block cipher, such as AES (potentially in CTR mode or GCM), or a stream cipher, such as ChaCha (e.g., ChaCha20).

Due to the use of convergent encryption (e.g., in which the encryption key is selected based at least partly on a deterministic analysis of the plaintext to be encrypted), the encrypted ciphertext object can be expected to be identical to any other encrypted ciphertext object generated from the same plaintext block object using the same deterministic process (e.g., including the same salt value when modified convergent encryption is implemented). Thus, it is possible that other data sets previously processed via the system 130 according to the routine 600 would produce one or more block-level ciphertext objects identical to those produced during the loop 610. Accordingly, at block 616, the system 130 stores the generated block-level ciphertext object if that object is not already stored. For example, the system 130 may generate a MAC for the object using the ciphertext and the key (e.g., a Poly1305 MAC, GMAC, HMAC, etc.), and query a data store to determine whether an object with the MAC is already stored. Similarly, the system 130 may generate a hash value for the object by passing the ciphertext through a hash algorithm, and query the data store to determine whether an object with the hash value is already stored. If not, the system 130 may store the object. In some instances, the system 130 may attempt to store all objects, and deduplication may occur on a corresponding storage system. For example, the storage system may accept uploads of all block-level ciphertext objects, but store only unique objects. Alternatively, the storage system may accept uploads of all block-level ciphertext objects and later deduplicate those objects if duplicate copies exist on the system. In each instance, deduplication can be achieved on the storage system, thus reducing resource use of the system.

Thereafter, at block 620, the system 130 generates and stores a manifest identifying the block-level ciphertext objects (e.g., via their identifier on the storage system) and, for each block-level ciphertext object, the key by which the object is encrypted. The manifest may illustratively be encrypted, at least in part, according to a key that is specific to a user on behalf of which the data set is stored. For example, the keys for block-level ciphertexts may be encrypted. In some instances, other parts of the manifest (such as a listing of block-level ciphertexts) may be left unencrypted, such that a storage system can access unencrypted data for system-wide operations, such as garbage collection of unreferenced block-level ciphertexts. The routine 600 then ends at block 622.

Accordingly, via implementation of the routine 600, the system 130 can store a data set as a set of block-level ciphertexts, which collectively represent the data set, and a corresponding manifest that identifies the ciphertexts and enables re-creation of the data set from the set of block-level ciphertexts. Moreover, due to the use of block-level ciphertexts and corresponding manifests, security of the data set can be maintained while enabling block-level deduplication of the data set.

Figure 7:
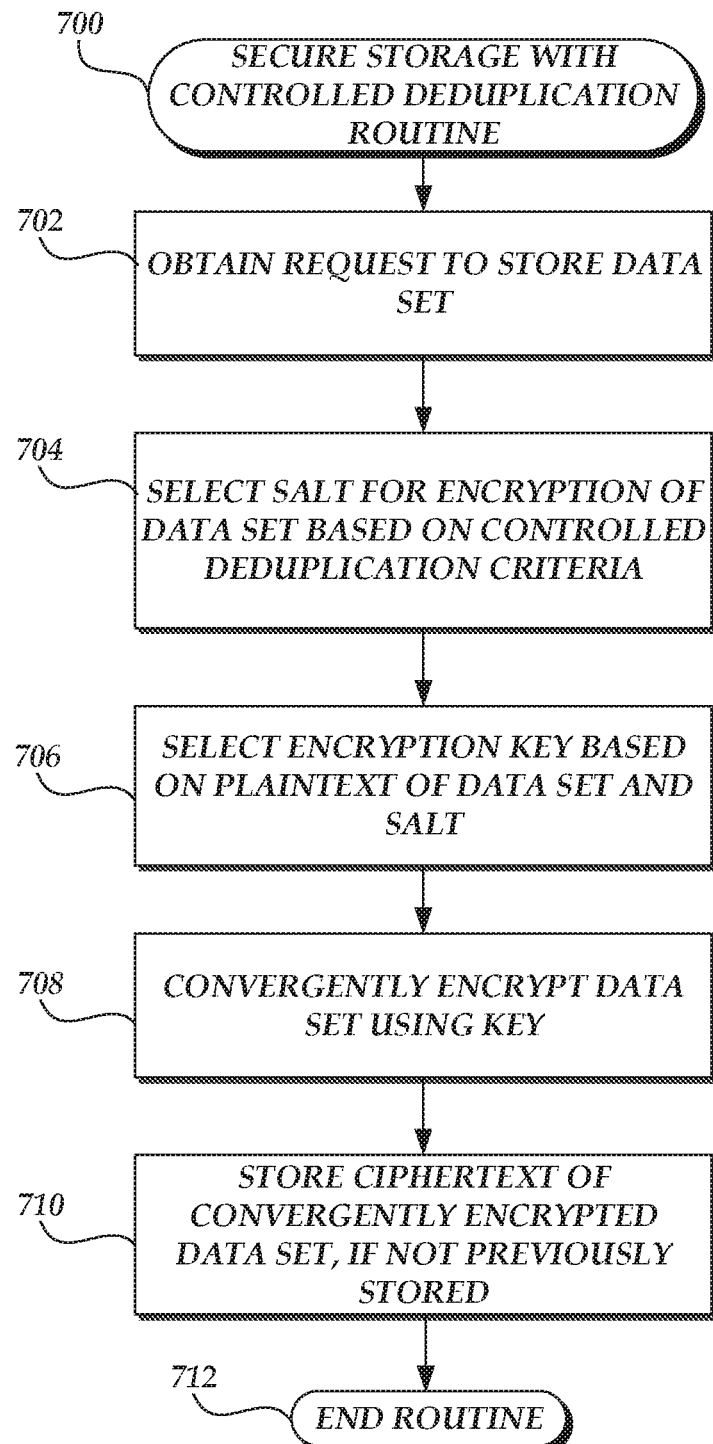
FIG. 7 is a flow chart depicting an illustrative routine for controlling redundancy in convergently encrypted data sets, by including salt values with a constrained number of permutations and thus enabling a single data set to result in a number of ciphertexts equal to the constrained number of permutations.

With reference to FIG. 7, an illustrative routine 700 will be described for controlling deduplication levels among encrypted data sets using dynamic salts. More specifically, a maximum replication level for a data set (e.g., a limit on potential deduplication) may be established by modifying a purely convergent encryption process to include, during determination of a key by which to encrypt plaintext, a salt with one of n potential values, where n is a desired maximum replication level for the data set. As discussed above, the addition of dynamic salts to an otherwise purely convergent encryption process (e.g., one in which identical plaintext always produces identical ciphertext) is referred to herein as "modified convergent encryption," which modified convergent encryption may be implemented according to the routine 700 of FIG. 7. The routine 700 may be implemented, for example, by the on-demand code execution system 130, such as by the disk image handling service 134.

The routine 700 beings at block 702, where the system 130 obtains a request to store a data set. The data set may represent, for example, a disk image to be provisioned to a virtualized environment of the system 130 to facilitate on-demand execution of user-specified code contained within the disk image.

At block 704, the system 130 selects a salt to be used during encryption of the disk image. To ensure deduplication, the salt is selected based on factors such as attributes of the request to store the data set or attributes of storage of the data set on a storage system. For example, a salt may be selected based on an account of a user who requested to store the data set, a number of times that the data set has been previously stored on the system, a time of the request to store the data set, or a location on the storage system in which the data set is to be stored.

Illustratively, with respect to the account of the user who requests to store a data set, one or more users of a storage system may "opt out" of deduplication, requesting that their files never be deduplicated with respect to files of other users. To avoid need to modify the routine 700 specifically to account for these users, a unique salt may be established for each such user (e.g., matching or corresponding to a account identifier, for example). By appending this salt to plaintext of the data set prior to convergent encryption, the system 130 can effectively ensure that no deduplication of the data set occurs with respect to others users, as even if other users submitted the same data set, the additional salt would cause a key for encrypting the data set to be different, and thus the ciphertext of the data set, as encrypted for the first user, would be expected to be different than the ciphertext of the data set as encrypted for other users.

As another illustration of user-varying salts, the system 130 may be configured such that some level of duplication is desired to ensure redundancy of data (thus limiting a "blast radius" of a failure with respect to the data set). In one embodiment, this redundancy is achieved by grouping users into n groups, where n is a desired redundancy level among all users. Illustratively, a unique identifier for each user (e.g., an account identifier, hash of an account identifier, etc.) may be modulus divided by n to place each user into one of n groups. Each group may be assigned a unique salt, such that duplicative data sets submitted by users of the same group are deduplicated, while duplicative data sets submitted by users of different groups are not.

As another example, deduplication may be controlled based on a number of times that the data set has been previously requested to be stored on a storage system. For example, the system 130 may record each instance in which a data set is requested to be stored, such as by storing a counter for a hash value of the data set. The system 130 may increment the counter each time a request to store the data set (e.g., across all requests, across requests for unique users, etc.) is received. The system 130 may select a unique salt value for each n times the data set is requested to be stored, such as by incrementing the salt value each time the counter exceeds a multiple of n. In this manner, deduplication can occur with respect to each n requests to store the data set (as the salt value used for each n requests would be the same), but deduplication would not occur between different sets of n requests, due to the varying salt values used between those sets. Use of such salt value may therefore limit the total number of times a data set is deduplicated on the system.

In some instances, deduplication may be controlled according to geography of storage. For example, a storage system may include devices distributed across multiple geographic regions or across isolated sets of computing devices (sometimes called "availability zones"). To provide deduplication without inhibiting redundancy, the system 130 may vary a salt for a data set according to where the data set is to be stored (which may be specified in the request, selected according to load balancing techniques, etc.). For example, data sets to be stored within the same region, availability zone, data store, etc., may be provided with the same salt, while data sets of different regions, zones, data stores, etc., may be provided with different salts. In this manner, deduplication can occur within a given geography but not between geographies, enabling geographic redundancy of storage.

As yet another example, deduplication may be controlled according to time of a request to store the data set, enabling deduplication within a time window but not across time windows. As noted above, time-differentiation of deduplication can be especially beneficial for some processes, such as garbage collection, which may otherwise incur race conditions when attempting to function (e.g., because a garbage collection process might be required to ensure that no user is using a stored data set, but compete in a race against users currently attempting to store the data set). Accordingly, a salt can be varied according to the time of a request to store the data sets, such that requests occurring during a first time period (e.g., a first week) are associated with a different salt than requests occurring during a second time period (e.g., a second week). Thus, deduplication can occur with respect to data sets stored during the same time period.

Each of the above-noted salting techniques may be applied independently, or may be combined with one or more of the other above-noted techniques. For example, where two salting techniques are applied, the two salt values may be concatenated together to form an aggregate salt for the data set. In some instances, salt values selected according to the above-noted techniques may be purely deterministic. In other instances, salt values may be selected probabilistically, such as by selecting between n potential values for the salt in a probabilistic manner (e.g., with probabilities varying according to attributes that contribute to the salt). For example, a time-based salt value may be selected based on a sliding probability scale, with the particular probability of a given salt being selected shifting along the scale over time. Notable, despite potential probabilistic selection of salt values, the maximum potential replication of a data set is constrained by the maximum possible number of salt values, thus maintaining deduplication benefits of purely convergent encryption while also providing the additional benefits noted herein.

After selection of a salt, the routine 700 proceeds to block 706, where an encryption key is selected according to the plaintext of the data set and the salt. Illustratively, the salt may be appended or prepended to the plaintext, and the resulting aggregate data may be passed through a hash function (such as the cryptographic hash functions noted above) to result in a hash value used as a key for encryption.

At block 708, the system 130 convergently encrypts the plaintext block object using the selected key, to result in an encrypted ciphertext object. For example, the system 130 may encrypt the plaintext block object using a block cipher, such as AES (potentially in CTR mode or GCM), or a stream cipher, such as ChaCha (e.g., ChaCha20).

At block 710, the system 130 stores the ciphertext of the encrypted data set, if that data set is not previously stored. For example, the system 130 may generate a MAC for the object using the ciphertext and the key (e.g., a Poly1305 MAC, GMAC, HMAC, etc.), and query a data store to determine whether an object with the MAC is already stored. Similarly, the system 130 may generate a hash value for the object by passing the ciphertext through a hash algorithm, and query the data store to determine whether an object with the hash value is already stored. If not, the system 130 may store the ciphertext. In some instances, the system 130 may attempt to store all ciphertext objects, and deduplication may occur on a corresponding storage system. For example, the storage system may accept uploads of all ciphertext objects, but store only unique objects. Alternatively, the storage system may accept uploads of all ciphertext objects and later deduplicate those objects if duplicate copies exist on the system. In each instance, deduplication can be achieved on the storage system, thus reducing resource use of the system. The routine 700 then ends at block 712.

While described separately, the routines 600 and 700 may be used independently or in conjunction. For example, the routine 600 may be used to provide purely convergent encryption of blocks of a data set, or may modify convergent encryption to utilize salt values as discussed in the routine 700. Similarly, the routine 700 may be used to encrypt data sets of various different sizes or properties, or may be used to encrypt blocks of a larger data set. Moreover, while described in the context of an on-demand code execution system 130, the routines 600 and 700 may be utilized by other computing devices to store a variety of different types of data sets. In some embodiments, the routines 600 and 700 may be modified to include additional actions appropriate to a given data set. For example, where a to-be-stored data set is a layered disk image, either the routine 600 or the routine 700 may be modified to include a formatting of the layered disk image into a non-layered image, such as a deterministically generated ext4 filesystem. Thus, descriptions of the routines 600 and 700 are therefore intended for illustration.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A storage system facilitating deduplication of encrypted data, the storage system comprising:
   one or more data stores configured to store:
      block-level ciphertext objects, each block-level ciphertext object representing a fixed-length plaintext object convergently encrypted to result in the block-level ciphertext object; and
      data set manifests, each data set manifest corresponding to a data set and identifying (i) a collection of block-level ciphertext objects within the one or more data stores that collectively represent the data set, and (ii) for each block-level ciphertext object within the collection, an encryption key by which the block-level ciphertext object was encrypted, wherein each encryption key is deterministically derived based at least in part on a fixed-length plaintext object represented by the block-level ciphertext object;
   one or more computing devices including a hardware processor and associated with the storage system, the one or more computing devices configured to:
      obtain, from a computing device of a first user, a request to store a particular data set on the storage system;
      divide the particular data set into a set of fixed-length plaintext objects, wherein a length of each fixed-length plaintext object is shared with fixed-length plaintext objects generated from one or more additional data sets, of one or more additional users distinct from the first user, stored on the storage system;
      generate a set of block-level ciphertext objects representing the set of fixed-length plaintext objects in encrypted form, wherein generation of the set of block-level ciphertext objects comprises, for each fixed-length plaintext object of the set of fixed-length plaintext objects, convergently encrypting the fixed-length plaintext object with an encryption key selected based at least in part on the fixed-length plaintext object to result in a block-level ciphertext object representing the fixed-length plaintext object;

store, within the one or more data stores, those block-level ciphertext objects of the set of block-level ciphertext objects that are not duplicative of a block-level ciphertext object already stored within the one or more data stores;

generate a manifest for the particular data set, the manifest for the particular data set identifying the set of block-level ciphertext objects that collectively represent the particular data set and, for each block-level ciphertext object of the set of block-level ciphertext objects, the encryption key with which the block-level ciphertext object is encrypted; and store the manifest for the particular data set within the one or more data stores.

2. The system of claim 1, wherein the encryption key of each fixed-length plaintext object is a hash value for the fixed-length plaintext object generated by processing the fixed-length plaintext object through a cryptographic hash algorithm.

3. The system of claim 2, wherein the cryptographic hash algorithm is one of a Secure Hash Algorithm (SHA) family algorithm or a BLAKE family algorithm.

4. The system of claim 1, wherein convergently encrypting the fixed-length plaintext object comprises encrypting the fixed-length plaintext object using at least one of a block cipher or a stream cipher.

5. The system of claim 1, wherein the particular data set is a disk image containing code executable on a serverless code execution system, and wherein the one or more computing devices are further configured to:

obtain a request to execute the code on the serverless code execution system;

obtain, from the one or more data stores, the manifest for the particular data set;

identify, from the manifest for the particular data set, a subset of the set of block-level ciphertext objects that are not cached at the serverless code execution system;

retrieve the subset of block-level ciphertext objects;

decrypt the set of block-level ciphertext objects using the encryption keys included within the manifest to result in the particular data set;

provision a virtualized execution environment of the serverless code execution system with the particular data set; and execute the code within the virtualized execution environment.

6. A method implemented by at least one computing device comprising a processor and associated with a storage system, the method comprising:

obtaining from a computing device of a first user a request to store a data set on the storage system;

dividing the data set into a set of fixed-length plaintext objects, wherein a length of each fixed-length plaintext object is shared with fixed-length plaintext objects generated from one or more additional data sets, of one or more additional users distinct from the first user, stored on the storage system;

generating a set of block-level ciphertext objects representing the set of fixed-length plaintext objects in encrypted form, wherein generating the set of block-level ciphertext objects comprises, for each fixed-length plaintext object of the set of fixed-length plaintext objects, convergently encrypting the fixed-length plaintext object with an encryption key derived based at least in part on the fixed-length plaintext object to result in a block-level ciphertext object representing the fixed-length plaintext object;

storing, within the storage system, those block-level ciphertext objects of the set of block-level ciphertext objects that are not duplicative of a block-level ciphertext object that is already stored within the storage system;

generating a manifest for the data set, the manifest identifying the set of block-level ciphertext objects that collectively represent the data set and, for each block-level ciphertext object of the set of block-level ciphertext objects, the encryption key with which the block-level ciphertext object is encrypted; and storing the manifest within the storage system.

7. The method of claim 6 further comprising encrypting, using an additional key, a portion of the manifest containing the encryption keys for each block-level ciphertext object of the set of block-level ciphertext objects.

8. The method of claim 6 further comprising generating an identifier for each block-level ciphertext object of the set of block-level ciphertext objects, wherein the identifier for each block-level ciphertext object is at least one of a message authentication code (MAC) of the block-level ciphertext object or a hash value of the block-level ciphertext object.

9. The method of claim 8, wherein the identifier for each block-level ciphertext object includes a message authentication code (MAC) of the block-level ciphertext object, and wherein the MAC of the block-level ciphertext object is generated based on the block-level ciphertext object and the encryption key by which the block-level ciphertext object is encrypted.

10. The method of claim 8, wherein the identifier for each block-level ciphertext object includes a message authentication code (MAC) of the block-level ciphertext object, and wherein the MAC is at least one of a hash-based MAC (HMAC), a Galois/Counter Mode MAC (GMAC), or a Poly1305 MAC.

11. The method of claim 8 further comprising determining those block-level ciphertext objects of the set of block-level ciphertext objects that are not duplicative by comparing the MAC of each block-level ciphertext object of the set of block-level ciphertext objects against MACs of block-level ciphertext objects that are already stored within the storage system.

12. The method of claim 6, wherein convergently encrypting the fixed-length plaintext object comprises encrypting the fixed-length plaintext object using at least one of Advanced Encryption Standard (AES) encryption or ChaCha encryption.

13. The method of claim 6, wherein convergently encrypting the fixed-length plaintext object comprises encrypting the fixed-length plaintext object using at least one of a counter mode or a Galois/Counter Mode (GMC) of an encryption algorithm.

14. The method of claim 6, wherein convergently encrypting the fixed-length plaintext object comprises:

adding to the fixed-length plaintext object a salt value selected from a constrained number of permutations corresponding to a desired redundancy of the fixed-length plaintext object on the storage system;

hashing the fixed-length plaintext object and the salt value according to a cryptographic hashing algorithm to result in a hash value; and using the hash value as the encryption key by which to convergently encrypt the fixed-length plaintext object.

15. The method of claim 14, wherein the salt value is selected according to at least one of a user requesting to store the data set, a time of the request to store the data set, a location on the storage system on which the data set is requested to be stored, or a state of present storage of the data set on the storage system.

16. One or more non-transitory computer-readable media comprising computer-executable instructions that, when executed by at least one computing device comprising a processor and associated with a storage system, cause the at least one computing device to:
- obtain from a computing device of a first user a request to store a data set on a storage system;
- divide the data set into a set of fixed-length plaintext objects, wherein a length of each fixed-length plaintext object is shared with fixed-length plaintext objects generated from one or more additional data sets, of one or more additional users distinct from the first user, stored on the storage system;
- generate a set of block-level ciphertext objects representing the set of fixed-length plaintext objects in encrypted form, wherein generating the set of block-level ciphertext objects comprises, for each fixed-length plaintext object of the set of fixed-length plaintext objects, convergently encrypting the fixed-length plaintext object with an encryption key derived based at least in part on the fixed-length plaintext object to result in a block-level ciphertext object representing the fixed-length plaintext object;
- store, within the storage system, those block-level ciphertext objects of the set of block-level ciphertext objects that are not duplicative of a block-level ciphertext object that is already stored within the storage system;
- generate a manifest for the data set, the manifest identifying the set of block-level ciphertext objects that collectively represent the data set and, for each block-level ciphertext object of the set of block-level ciphertext objects, the encryption key with which the block-level ciphertext object is encrypted; and
- store the manifest.

17. The one or more non-transitory computer-readable media of claim 16, wherein the storage system disallows, within a single operation, querying of whether the storage system has stored multiple block-level ciphertext objects, and wherein the computer-executable instructions further cause the computing system to identify those block-level ciphertext objects of the set that are not duplicative by submitting, for each block-level ciphertext object of the set of block-level ciphertext objects, an operation querying whether the block-level ciphertext object is stored on the storage system.

18. The one or more non-transitory computer-readable media of claim 17, wherein the operation querying whether the block-level ciphertext object is stored on the storage system identifies the block-level ciphertext object by at least one of a MAC of the block-level ciphertext object or a hash value of the block-level ciphertext object.

19. The one or more non-transitory computer-readable media of claim 16, wherein to convergently encrypt the fixed-length plaintext object, the instructions cause the computing system to:
- add to the fixed-length plaintext object a salt value selected from a constrained number of permutations corresponding to a desired redundancy of the fixed-length plaintext object on the storage system;
- hash the fixed-length plaintext object and the salt value according to a cryptographic hashing algorithm to result in a hash value; and
- use the hash value as the encryption key by which to convergently encrypt the fixed-length plaintext object.

20. The one or more non-transitory computer-readable media of claim 16,
wherein the instructions further cause the computing system to:
obtain a request to retrieve the data set;
identify, from the manifest, the set of block-level ciphertext objects;
retrieve the set of block-level ciphertext objects from the storage system;
decrypt each block-level ciphertext object of the set of block-level ciphertext objects using the encryption key for the block-level ciphertext object identified within the manifest; and
combine plaintext objects resulting from decryption of each block-level ciphertext object to result in the data set.

* * * * *